US010768414B2

(12) United States Patent
Ho et al.

(10) Patent No.: US 10,768,414 B2
(45) Date of Patent: Sep. 8, 2020

(54) LENS DEVICE FOR COMPENSATING ABERRATION IN THE OPTICAL SYSTEM AND THE ADJUSTMENT METHOD THEREOF

(71) Applicant: NATIONAL APPLIED RESEARCH LABORATORIES, Taipei (TW)

(72) Inventors: Cheng-Fang Ho, Hsinchu (TW); Wei-Jie Peng, Hsinchu (TW); Wei-Yao Hsu, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 168 days.

(21) Appl. No.: 16/028,492

(22) Filed: Jul. 6, 2018

(65) Prior Publication Data
US 2019/0025576 A1 Jan. 24, 2019

(30) Foreign Application Priority Data

Jul. 20, 2017 (TW) .............................. 106124431 A

(51) Int. Cl.
G02B 27/00 (2006.01)
G02B 7/02 (2006.01)

(52) U.S. Cl.
CPC ......... *G02B 27/0068* (2013.01); *G02B 7/021* (2013.01); *G02B 7/026* (2013.01)

(58) Field of Classification Search
CPC ..... G02B 27/0068; G02B 7/021; G02B 7/026
USPC ........................................................ 359/754
See application file for complete search history.

(56) References Cited

U.S. PATENT DOCUMENTS 2,767,612 A * 10/1956 Ondratschek .......... G02B 7/021
359/794
2007/0177281 A1* 8/2007 Darmes .................... G02B 3/00
359/811

OTHER PUBLICATIONS

Peng et al., "Self-compensation for trefoil aberration of symmetric dioptric microlithographic lens," Optical System Alignment, Tolerancing, and Verification XI, 8 pages, Aug. 22, 2017, vol. 10377, International Society for Optics and Photonics.
(Continued)

Primary Examiner — James R Greece
(74) Attorney, Agent, or Firm — Haynes and Boone, LLP

(57) ABSTRACT

The present invention discloses a lens device suitable for the large-diameter lenses (with diameter ≥100 mm) of a vertical setup, and its adjustment method. The aberration caused by the self-gravity of lenses and the deformation generated by the clamping stress of the fixing device is compensated.

19 Claims, 14 Drawing Sheets

(56) References Cited

OTHER PUBLICATIONS

Peng et al., "Design, tolerance analysis, fabrication, and testing of a 6-in. dual-wavelength transmission sphere for a Fizeau interferometer," p. 035105, Mar. 2017, vol. 56 Issue 3, Optical Engineering.
Peng et al., "Mounting of reference surface for a transmission sphere," In8th International Symposium on Advanced Optical Manufacturing and Testing Technologies: Optical Test, Measurement Technology, and Equipment, 8 pages, Sep. 27, 2016, vol. 9684, International Society for Optics and Photonics.
Peng et al., "Optimization of sub-cells orientation for assembly of a high-quality transmission sphere," InOptifab 2015, 8 pages, Oct. 11, 2015, vol. 9633, International Society for Optics and Photonics.
Peng et al., "Design and tolerance analysis of a transmission sphere by interferometer model," InOptical System Alignment, Tolerancing, and Verification IX, 10 pages, Sep. 3, 2015, vol. 9582, International Society for Optics and Photonics.

\* cited by examiner

LENS DEVICE FOR COMPENSATING ABERRATION IN THE OPTICAL SYSTEM AND THE ADJUSTMENT METHOD THEREOF

CROSS-REFERENCE TO RELATED APPLICATION AND CLAIM OF PRIORITY

The application claims the benefit of Taiwan Patent Application No. 106124431, filed on Jul. 20, 2017, at the Taiwan Intellectual Property Office, the disclosures of which are incorporated herein in their entirety by reference.

FIELD OF THE INVENTION

The invention is related to a lens device and its adjustment method, and more particularly to a lens device for compensating aberration in an optical system and its adjustment method.

BACKGROUND OF THE INVENTION

In the application field of ultra-high precision optical lens such as lithographic projection lens, the requirement of lens performance is high and tolerance is tight. For an optical system assembled with a number of lenses, an aberration due to accumulated deformation of multiple lenses would lead to degeneration of optical quality. On the other hand, the optical quality of a large size lens will degenerate with the surface deformation produced by the self-gravity of the lens and the clamping stress of its retainer. Therefore, the retainers of the lenses need to be specially designed to maintain the optical quality.

The lithographic projection lens in the semiconductor industry projects the pattern of a mask onto a wafer. The required linewidth resolution of the pattern on wafer is at least micro-scale or finer nano-scale, and so the lithographic projection lens is a diffraction limit optical system and the optical quality is evaluated using wavefront error. The wavefront will be changed and distorted by the lens power and surface error, such as the surface form accuracy or surface deformation. When the light passing through all the lens elements and the wavefront is distorted, the total wavefront error is the superposition of each distorted wavefront of lens. Therefore, even though the lenses are perfect and located at the correct positions, the assembly of large size lenses (e.g., with diameter ≥100 mm) would still have the problems of the above-mentioned lens surface deformation and stress caused by the self-gravity of the lens and the clamping of the retainer, resulting in degeneration in the optical performance, and thus good image quality is not guaranteed.

Most of the lithographic projection lenses are vertical setups. In the prior art, the three-point supporting retainer technique supplemented by an elastic supporting structure retains the lens in a lens barrel, to reduce the clamping stress and lens deformation. However, even if there are special designs on the retainers, the residual surface deformation would still exist. A lithographic projection lens is usually composed of ten or more lenses, the wavefront error from the accumulation and superimposition of the residual wavefront distortions caused by the deformed lenses reduces the final optical quality.

Lenses are rotated about their lens axes, or polarization elements are added to compensate for aberration in the prior art. Such techniques are common in the production of lithographic projection lenses. For example, lithographic lens supplier Carl Zeiss SMT and lithography system manufacturer ASML have both disclosed the above techniques. But their features and problems to be solved are different from those of the present invention.

Carl Zeiss SMT discloses in U.S. Pat. No. 6,697,199 B2 "Objective with lenses made of a crystalline material" and U.S. Pat. No. 7,239,447 B2 "Objective with crystal lenses" that through rotating lenses about their lens axes, the phase retardation produced by the intrinsic birefringence of optical materials with cubic lattice structures is compensated, to reduce the effect of wavefront error on the optical quality.

ASML discloses in U.S. Pat. No. 6,970,232 B2 "Structures and methods for reducing aberration in integrated circuit fabrication systems" and U.S. Pat. No. 7,738,172 B2 "Structures and methods for reducing aberration in optical systems" that by utilizing polarization optical elements configured inside a lithographic projection lens to rotate the polarization of light about an axis, the phase retardation produced by the intrinsic birefringence of optical materials with cubic lattice structures is compensated. In addition, compensation effect can also be achieved through configuring different optical material lenses with cubic lattice structures to rotate the polarization of light about an axis.

James P. McGuire discloses methods of aberration compensation in optical systems in US patent publication No. 2003/0086171 A1 "Methods for reducing aberration in optical systems." The patent proposes a solution for the aberration in optical lens caused by polarizations and cubic optical materials, and utilizes the configuration of the polarization states among the polarization modulating elements in a first group, a second group and between the first and the second groups in the lens to compensate for the aberration.

The prior art mostly discloses methods of aberration compensation for high numerical aperture lithographic projection lens containing optical material with a cubic lattice structure such as CaF2, where the aberration or the wavefront error come from the intrinsic birefringence produced by the lattice structure of the cubic optical material itself. The methods disclosed in the prior art frequently have the disadvantages of materials being difficult to manufacture, high cost or the lens being difficult to mass produce, and they do not compensate for the aberration caused by the self-gravity of the lens and the clamping of its retainer.

In order to overcome the drawbacks in the prior art, a lens assembly device and an adjustment method for lenses in a lens assembly are disclosed.

SUMMARY OF THE INVENTION

The present invention discloses a lens assembly device and an adjustment method for lenses in a lens assembly which are different from those in prior art. Retainers are systematically arranged at appropriate positions for each lens, to synthetically compensate for the aberration due to the deformation of each lens caused by the clamping of the retainer, so as to reduce the final residual wavefront error of the optical system.

The present invention decreases the effect of lens surface deformation on system image quality through rotating the retainer of each lens relative to adjacent lens, to synthetically compensate for the aberration produced by the deformation of each lens, and to reduce the final residual aberration of the optical system. The proposed method has a compensation effect on the deformations of all lens surfaces with rotated symmetry, and is easy to perform, and advantageous for the lens to manufacture, assemble and produce.

The present invention discloses a configuration method for the retainers of a lens assembly, especially applicable to large size lens assemblies having vertical setups. Besides correcting for the deformation and aberration produced by the clamping stress of the retainer mentioned above, it can further compensate for the deformation and aberration caused by the self-gravity of the lens in the optical system.

In accordance with one aspect of the present invention, an adjustment method for lenses in a lens assembly is disclosed, wherein the lens assembly includes a plurality of lenses having a total number of lenses being at least 3. The method includes: arranging the plurality of lenses along an optical axis, wherein a light moves forward along a first direction of the optical axis; dividing at least a portion of the plurality of lenses into 2n groups, wherein n is a positive integer, the 2n groups are divided into a 1st group to a 2n-th group including n odd-numbered groups and n even-numbered groups, a j-th group of the 2n groups has m(j) lenses, j is a positive integer being no larger than 2n, m(j) is a positive integer being at least 2, the lenses in each of the 2n groups include a 1(j)st lens, ..., an (i−1)(j)-th lens, an i(j)-th lens, ..., and an m(j)-th lens, i is a positive integer being no larger than m(j), the odd-numbered groups from the 1st group to the (2n−1)-th group correspond sequentially to the even-numbered groups from the 2nd group to the 2n-th group, and the lenses in the odd-numbered groups correspond sequentially to the lenses in the corresponding even-numbered groups; configuring a plurality of retainers for the plurality of lenses, wherein each of the plurality of retainers has a corresponding lens in the plurality of lenses, each of the plurality of retainers retains the corresponding lens through k support elements, k is a positive integer being no less than 2, the k support elements are evenly distributed around an edge of the corresponding lens, each of the k support elements has a retention position, and the retention positions of the k support elements for both the i(2n−1)-th lens of the (2n−1)-th group and the i(2n)-th lens of the 2n-th group are the same; rotating each of the retention positions of the k support elements for the i(2n−1)-th lens, wherein an h-th support element of the k support elements for the i(2n−1)-th lens is rotated by a rotation angle α with respect to the retention position of a first support element of the k support elements for the (i−1)(2n−1)-th lens, $$\alpha = \frac{360°}{k \times m_{(2n-1)}} + (h-1) \times \frac{360°}{k},$$

where h is an integer from 1 to k, so that when observed from the optical axis, the retention positions of the k support elements for the (i−1)(2n−1)-th lens are different from the retention positions of the k support elements for the i(2n−1)-th lens, and the retention positions of the k support elements for the (i−1)(2n)-th lens are different from the retention positions of the k support elements for the i(2n)-th lens.

In accordance with a further aspect of the present invention, a lens assembly device is disclosed. The lens assembly device includes: a plurality of lenses having a total number of lenses being at least 3, wherein the plurality of lenses are arranged along an optical axis, a light moves forward along a first direction of the optical axis, and at least a portion of the plurality of lenses are divided into 2n groups including n odd-numbered groups and n even-numbered groups, n is a positive integer, a j-th group of the 2n groups has m(j) lenses, j is a positive integer being no larger than 2n, m(j) is at least 2, the lenses in each of the 2n groups include a 1(j)st lens, ..., an (i−1)(j)-th lens, an i(j)-th lens, ..., and an m(j)-th lens, i is a positive integer being no larger than m(j), the odd-numbered groups from the 1st group to the (2n−1)-th group correspond sequentially to the even-numbered groups from the 2nd group to the 2n-th group, and the lenses in the odd-numbered groups correspond sequentially to the lenses in the corresponding even-numbered groups; a plurality of retainers, wherein each of the plurality of retainers retains an edge of a lens of the odd-numbered groups and the even-numbered groups through a plurality of support elements, the i(2n−1)-th lens has k support elements, each of the plurality of support elements has a retention position, and the retention positions of the plurality of support elements for both the i(2n−1)-th lens of the (2n−1)-th group and the i(2n)-th lens of the 2n-th group are the same; and a rotating unit coupled to the plurality of retainers and configured to rotate the retention position of an h-th support element of the k support elements for the i(2n−1)-th lens by a rotation angle α(h) with respect to the retention position of a first support element of the k support elements for the (i−1)(2n−1)-th lens, wherein $$\alpha(h) = \frac{360°}{k \times m_{(2n-1)}} + (h-1) \times \frac{360°}{k},$$

where h is an integer from 1 to k, so that when observed from the optical axis, the retention position of the h-th support element of the k support elements for the i(2n−1)-th lens is the same as the retention position of the h-th support element of the k support elements for the i(2n)-th lens, and the retention position of the h-th support element for the (i−1)(2n)-th lens is different from both the retention positions of the h-th and the (h−1)-th support elements for the i(2n)-th lens.

In accordance with another aspect of the present invention, a lens assembly device is disclosed. The lens assembly device includes: a plurality of lenses arranged sequentially along an optical axis; and a plurality of retainers for respectively retaining the plurality of lenses, wherein: each of the plurality of retainers includes a plurality of support elements for retaining an edge of the respective lens under a relatively low stress; the plurality of support elements for a first lens in the plurality of lenses have a first retention position combination; the plurality of support elements for a second lens in the plurality of lenses have a second retention position combination; and there is a rotation angle α between the first retention position combination and the second retention position combination.

BRIEF DESCRIPTION OF THE DRAWINGS

The details and advantages of the present invention will become more readily apparent to those ordinarily skilled in the art after reviewing the following detailed descriptions and accompanying drawings.

DETAILED DESCRIPTION OF THE PREFERRED EMBODIMENT

A general lens assembly includes symmetric and asymmetric configurations. Please refer to FIG. 1, which is an example of a lens assembly configured in a sub lens barrel (not shown). The lens assembly includes symmetric lens groups a1 and a2, symmetric lens groups b1 and b2, and asymmetric lens groups c and d. Lenses a11 and a12 in the symmetric lens group a1 and lenses a21 and a22 in the symmetric lens group a2 are respectively symmetric with respect to the symmetric plane a0s. Lenses b11, b12 and b13 in the symmetric lens group b1 and lenses b2, b22 and b23 in the lens group b2 are respectively symmetric with respect to the symmetric plane b0s. The line connecting the center of curvature of each lens surface is an optical axis a00. Each lens is configured in the corresponding sub lens barrel (not shown). The retention device of the supporting structure in the sub lens barrel clamps each lens. Light enters the lens assembly from the top. Light rays pass through the lenses in each of the above-mentioned lens groups, and are then projected to a target (not shown) below the lens assembly. It is worth noting that, in order to achieve the effect of correcting the deformation and aberration produced by the clamping stress of the retention device, each symmetric lens group and each asymmetric lens group should include at least two lenses. Therefore, in FIG. 1, lenses c1 and c2 in the asymmetric lens group c and lens dl in the asymmetric lens group d can be classified as one group, so as to apply the configuration method of the retention devices of the present invention to the asymmetric configuration.

Figure 2:
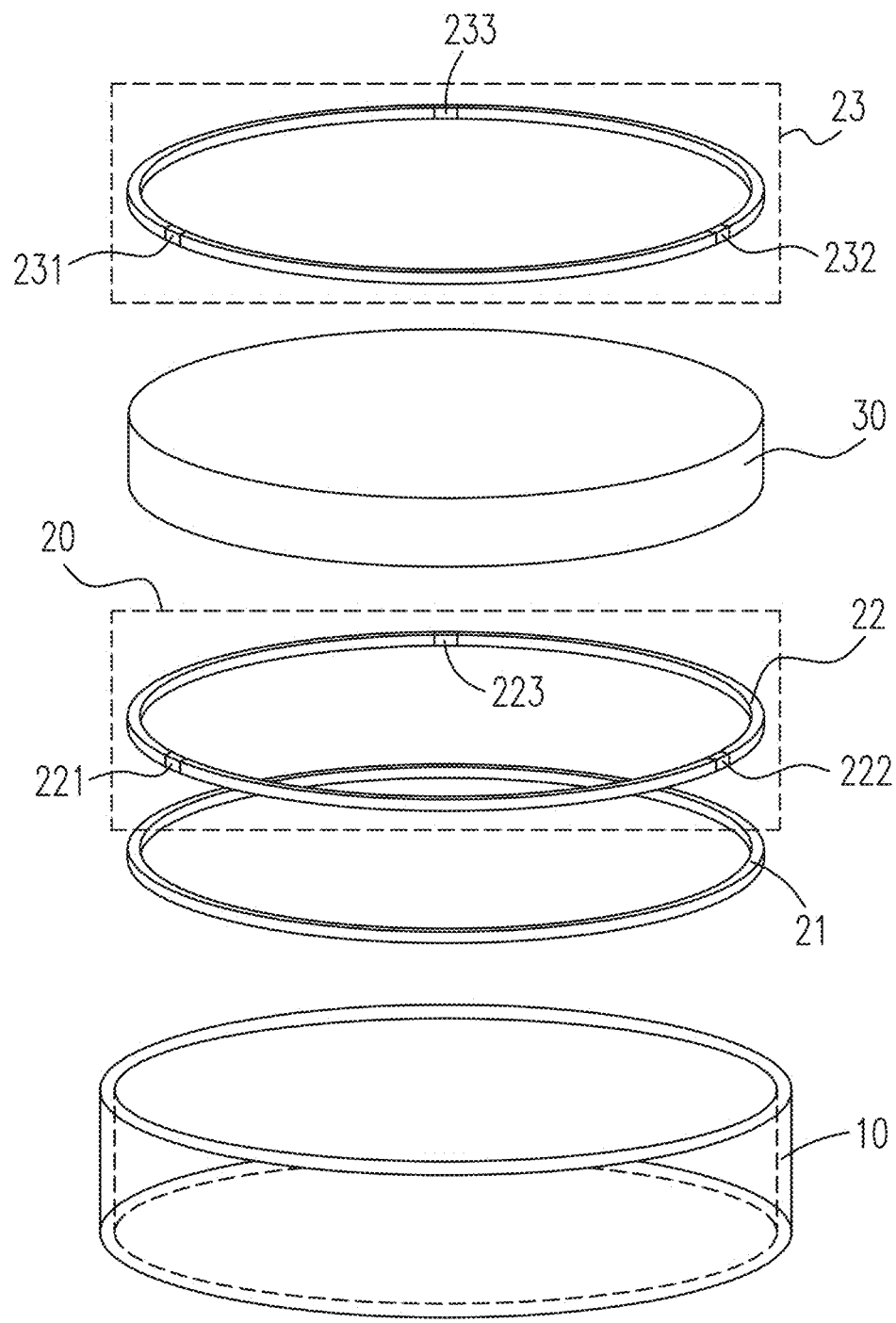
FIG. 2 is an application schematic diagram of a general sub lens barrel in the prior art.

FIG. 2 shows an example of application schematic diagram of a general sub lens barrel in the prior art. In the example, a lens 30 is configured in a sub lens barrel 10. There is a hollow ring-shaped retention device 22 in the sub lens barrel 10. Configured on the retention device 22, there are three support elements, namely a first support element 221, a second support element 222 and a third support element 223, uniformly distributed on the ring of the retention device 22 and 120° apart from one another, to support upward the lower edge of the lens 30. The retention device 22 and the first support element 221, the second support element 222 and the third support element 223 form a specific retention position combination or a rotating unit 20. In practical application the retention device can have more than three support elements. Below the retention device 22 there is a hollow ring-shaped retainer 21. The retainer 21 is fixedly locked to the inner wall of the sub lens barrel 10, to hold the retention device 22 and the lens 30. A hollow ring-shaped auxiliary retention device 23 may be configured on the upper edge of the lens 30, to strengthen the fixing of the lens 30. There are three support elements 231, 232 and 233 configured on the auxiliary retention device 23. The lens 30 in the example shown in FIG. 2 is placed horizontally, but the retention device in the present invention is not limited to a device that mounts the lens horizontally.

Figure 3:
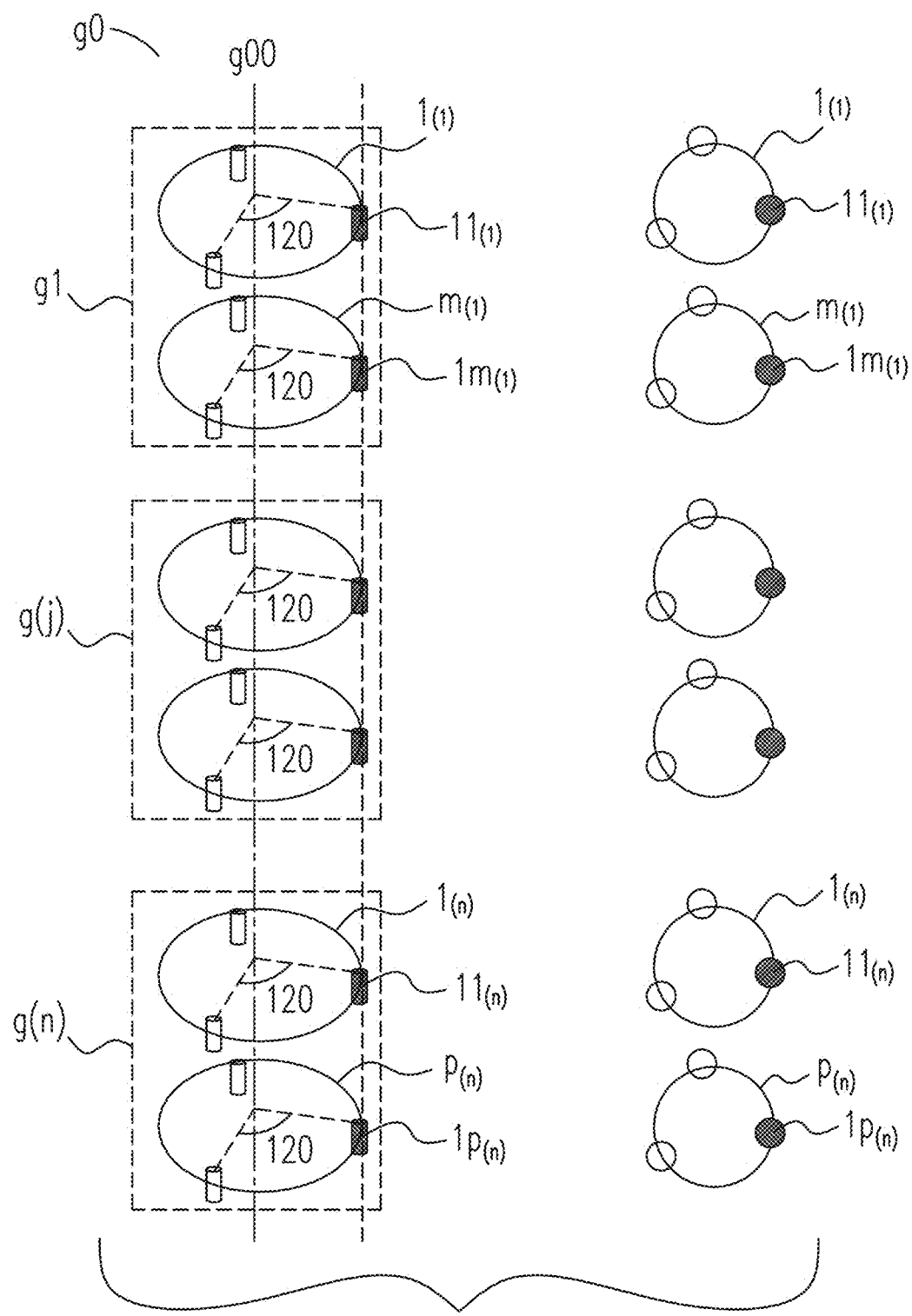
FIG. 3 is an application schematic diagram of a lens group in prior art without applying the retention devices in the present invention.

FIG. 3 shows an example of application schematic diagram of a lens group in prior art without applying the retention devices in the present invention. In the example, a lens assembly g0 includes n lens groups, each lens group including plural lenses in plural sub lens barrels (not shown). The plural sub lens barrels (not shown) are configured from top to bottom in a lens barrel (not shown). As shown in FIG. 2, each lens has plural support elements. Without applying the retention devices in the present invention, the retention position combination of each lens is exactly the same. In other words, the support position of each support element in each lens is identical. Specifically, all the first support elements $11(1)$, $1m(1)$, $11(n)$ and $1p(n)$ (marked in black) of the first lens $1(1)$, and the m-th lens $m(1)$ of the first lens group g1 to the first lens $1(n)$, and the p-th lens $p(n)$ of the n-th lens group g(n), respectively, have the same position for the corresponding lenses. Similarly, all the second support elements are located at the same position of the corresponding lenses, and so are all the third support elements.

Therefore, along the direction of optical axis g00 connecting the centers of curvature of the surfaces of the lenses in the lens assembly, when observed from the first lens $1(1)$ of the first lens group g1 to the p-th lens $p(n)$ of the n-th lens group g(n), the locations of all the first support elements of all lenses overlap, and so do the locations of all the second and the third support elements. Hence, for the light rays passing through each lens, the aberrations due to the deformation at the position of each support elements are mutually superimposed, causing degeneration in the final image quality.

Figure 4:
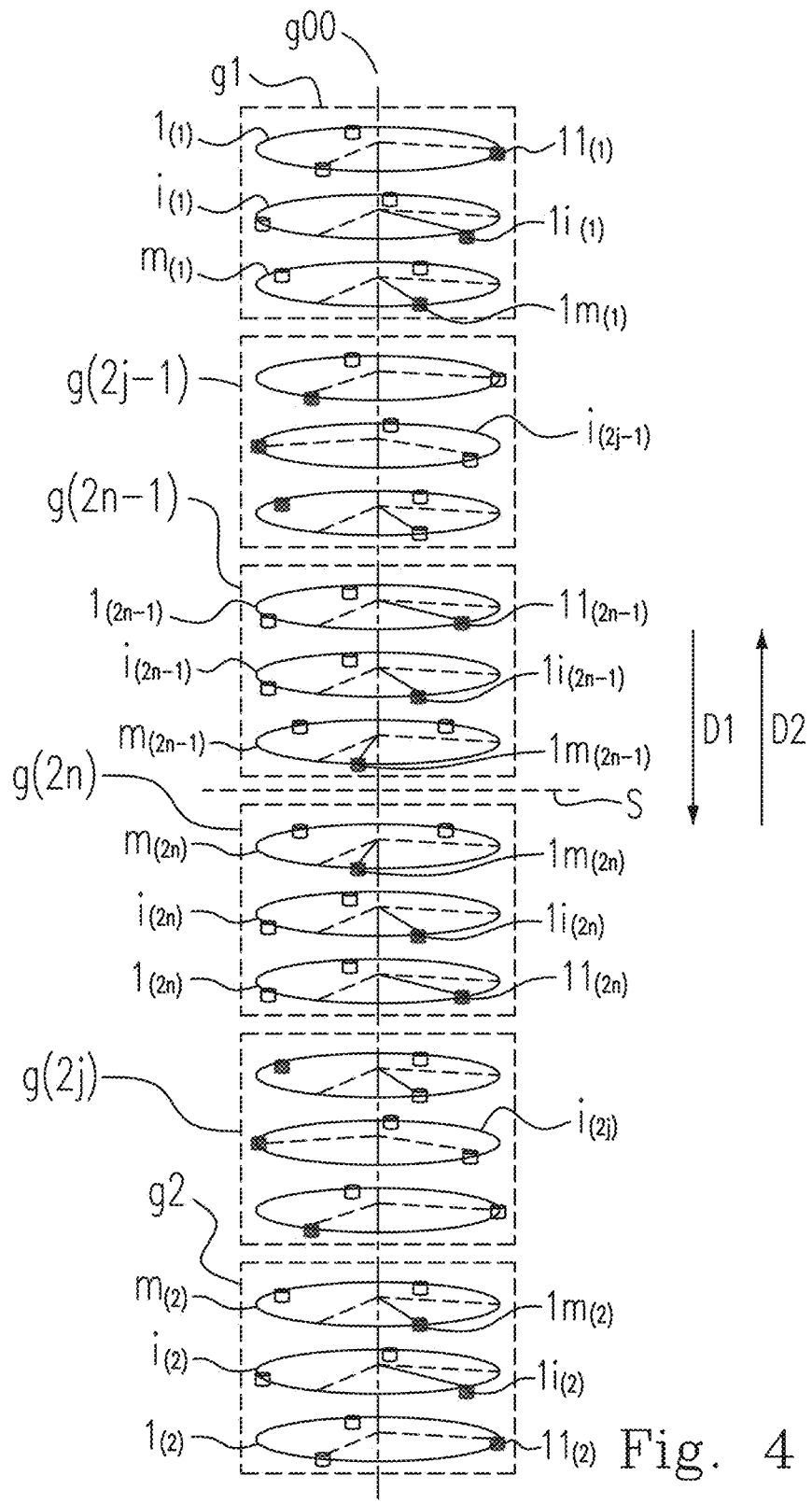
FIG. 4 is a schematic diagram of the retention devices configured for symmetric lenses in the present invention.

In order to handle the effect of lens surface deformation due to the clamping of retention devices on system image quality, the present invention compensates the above deformation via specific retention devices for symmetric lens configuration. As shown in FIG. 4, at least a portion of the plural lenses in an optical lens are first divided into 2n lens groups, where n is a positive integer. Then, the 2n lens groups are divided into odd-numbered lens groups (the odd number is expressed as 2n−1, n=1, 2, 3, . . . , j, . . . ) and even-numbered lens groups (the even number is expressed as 2n, n=1, 2, 3, . . . , j, . . . ). The lens group g(2j−1) in the odd-numbered lens groups and the lens group g(2j) in the even-numbered lens groups are called corresponding lens groups.

The first lens group g1 and the (2j−1)-th lens group g(2j−1) to the (2n−1)-th lens group g(2n−1) in the odd-numbered lens groups are sequentially configured in the lens barrel (not shown) along the first direction D1, and the second lens group g2 and the 2j-th lens group g(2j) to the 2n-th lens group g(2n) in the even-numbered lens groups are sequentially configured in the same lens barrel along the second direction D2 opposite to the first direction D1, so that the lenses in the odd-numbered lens groups and the even-numbered lens groups are mutually symmetric with respect to the symmetric plane S. Each lens group includes m (with corresponding subscript, see below) lenses, where m is greater than or equal to 2. The lenses in the odd-numbered lens groups from the first lens group g1 to the (2n−1)-th lens group g(2n−1) along the first direction D1 sequentially are (the l(1)st lens, . . . , the i(1)-th lens, . . . , and the m(1)-th lens), . . . , and (the l(2n−1)st lens, . . . , the i(2n−1)-th lens, . . . , and the m(2n−1)-th lens) configured in the lens barrel, where i is a positive integer being less than or equal to m (with corresponding subscript). The lenses in the even-numbered lens groups from the second lens group g2 to the 2n-th lens group g(2n) along the second direction D2 sequentially are (the l(2)st lens, . . . , the i(2)-th lens, . . . , and the m(2)-th lens), . . . , and (the l(2n)st lens, . . . , the i(2n)-th lens, . . . , and the m(2n)-th lens) configured in the same lens barrel. The i(2j−1)-th lens in the (2j−1)-th lens group g(2j−1) in the odd-numbered lens groups corresponds one-to-one to the i(2j)-th lens in the (2j)-th lens group g(2j) in the even-numbered lens groups, and the pair (the i(2j−1)-th lens in g(2j−1) and the i(2j)-th lens in g(2j)) are called corresponding lenses. In the example shown in FIG. 4, light rays enter the l(1)st lens of the first lens group g1, and exit the l(2)st lens of the second lens group g2.

The retention device configured for each lens has 3 support elements in the example. In practical application, a retention device can have more than three support elements. In the example the first support element of each lens, e.g., 11(1), 1i(1), 1m(1) to 11(2n−1), 1i(2n−1), 1m(2n−1) in the odd-numbered lens groups, or 11(2), 1i(2), 1m(2) to 11(2n), 1i(2n), 1m(2n) in the even-numbered lens groups, is marked. The support elements of each lens in each lens group are all rotated by a specific angle with respect to those of adjacent lens(es), and the rotations of corresponding support elements of the corresponding lenses of corresponding lens groups are characterized by the same specific angle. It can be seen from the example shown in FIG. 4 that, the configuration of the present invention for symmetric lens assembly device or optical lens is such that the rotation angles of the first support elements in the odd-numbered lens groups 11(1), 1i(1), 1m(1), 11(2n−1), 1i(2n−1), 1m(2n−1) are respectively the same as the rotation angles of the first support elements 11(2), 1i(2), 1m(2), 11(2n), 1i(2n), 1m(2n) in the even-numbered lens groups. That is to say, the configuration of the present invention for symmetric lens assembly device or optical lens makes the retention position combination of each odd-numbered lens group the same as the retention position combination of the corresponding even-numbered lens group. Therefore, the set of retention position combinations of the set of odd-numbered lens groups is also the same as the set of retention position combinations of the set of corresponding even-numbered lens groups.

Figure 5:
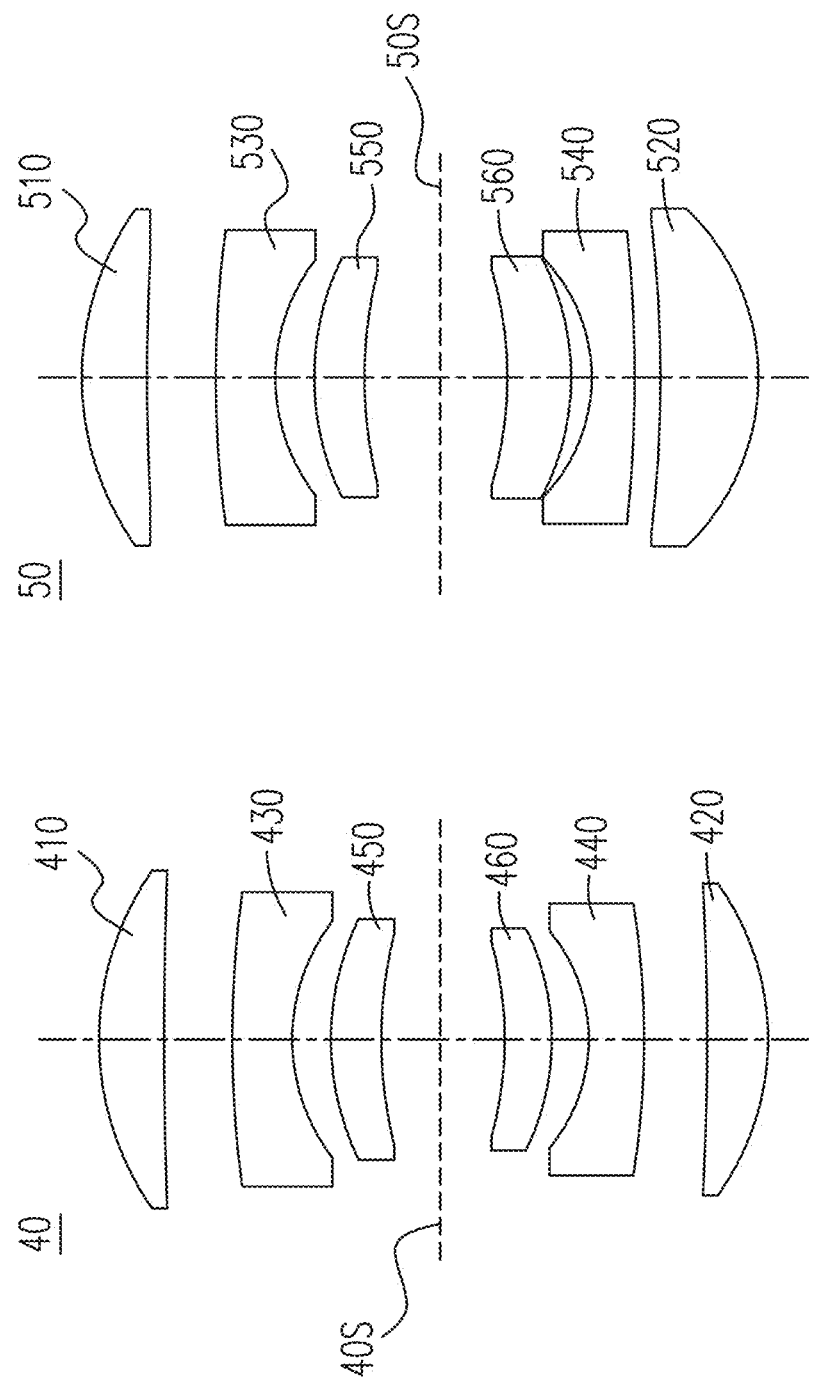
FIG. 5A is a schematic diagram of the structure of symmetric lenses.
FIG. 5B is a schematic diagram of the structure of quasi-symmetric lenses.

In one condition, each lens in the even-numbered lens groups has the same structure characteristics as those of the corresponding lens in the odd-numbered lens groups. The structure characteristics of lens include concave lens, convex lens, lens curvature, and lens thickness. If the structure characteristics of each lens in the odd-numbered lens groups are exactly the same as those of the corresponding lens in the even-numbered lens groups, the lens configuration structure of the odd-numbered lens groups and even-numbered lens groups is called the structure of symmetric lenses. For example, for the lens assembly 40 shown in FIG. 5A, lenses 410, 430 and 450 and lenses 420, 440 and 460 are respectively symmetric with respect to the symmetric plane 40S and form an example of the structure of symmetric lenses.

In another condition, the structure characteristics of each lens in the odd-numbered lens groups are not exactly the same as those of the corresponding lens in the even-numbered lens groups, but the difference(s) are limited to a specific range. In this case, the lens configuration structure of the odd-numbered lens groups and even-numbered lens groups is called the structure of quasi-symmetric lenses. Related parameters in determining quasi-symmetric lenses include the material properties (i.e. values of the ratio of Young's modulus/density) of corresponding lenses, the part scales of diameter to center thickness of corresponding lenses, the aspect ratios of the ratio of diameter to center thickness of corresponding lenses and the radii of curvature of corresponding lenses. When the related parameters of two corresponding lenses satisfy one of the following conditions, the two corresponding lenses are called quasi-symmetric lenses: (1) the difference of material properties, in which the material property is defined as the ratio of Young's modulus to specific gravity, is within ±20%; (2) the difference of the part scales of diameter to center thickness is within ±20%, but when the two corresponding lenses are double-convex lenses, the difference of the part scales is within ±10%; (3) the difference of aspect ratios of the ratio of diameter to center thickness is within ±20%, but when the two corresponding lenses are double-convex lenses, the difference of aspect ratios is within ±10%; (4) the difference of radii of curvature is within ±30%, but when the two corresponding lenses are both double-convex lenses, the difference of radii of curvature is within ±10%. For example, for the lens assembly 50 shown in FIG. 5B, lenses 510, 530 and 550 and lenses 520, 540 and 560 are respectively quasi-symmetric lenses, for which the distance between adjacent lenses does not matter, with respect to the symmetric plane 50S. The present invention can achieve the effect of compensating for the aberration caused by the deformation of each lens due to the clamping of its retention device for both the structure of symmetric lenses and the structure of quasi-symmetric lenses mentioned above.

Figure 6:
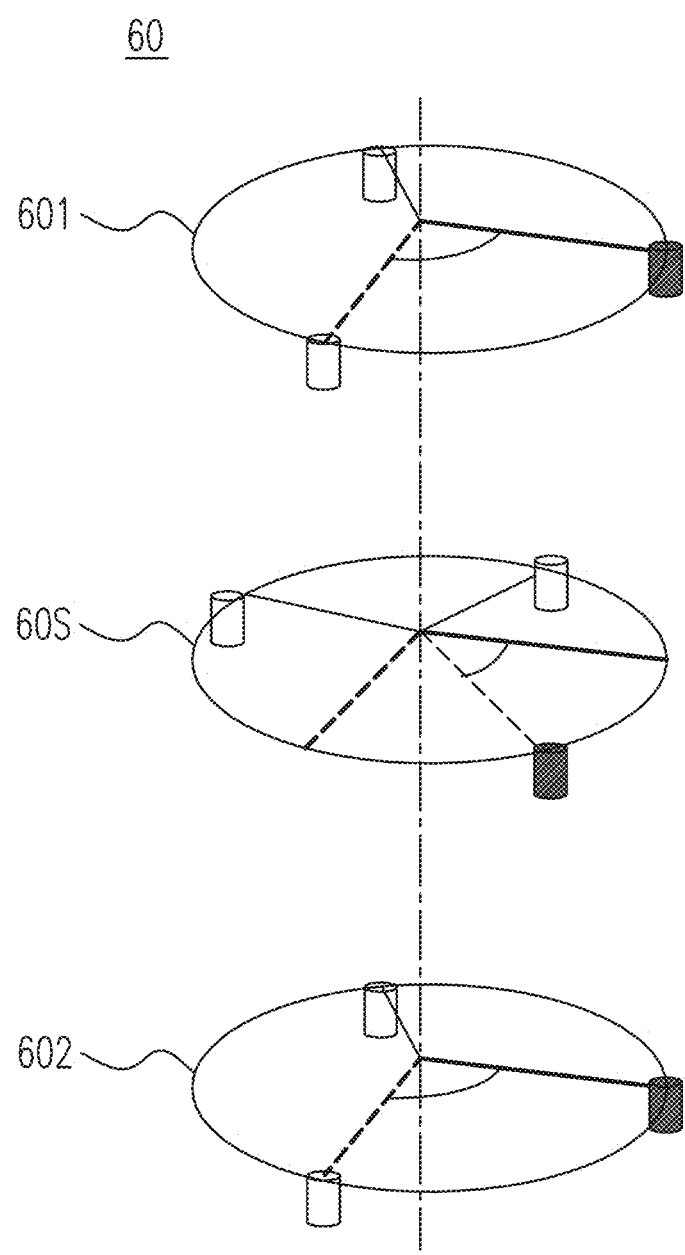
FIG. 6 is a schematic diagram of the retention devices configured for the quasi-symmetric lenses of a preferred embodiment of the present invention.

In a specific embodiment in the present invention such as the quasi-symmetric lens assembly 60 shown in FIG. 6, which can be considered as an application derived from FIG. 4, the minimal number of lenses required is 3, but the numbers of lenses and support elements for each lens in the present invention are not limited by this embodiment. The quasi-symmetric lens assembly 60 shown in FIG. 6 includes lenses 601, 60S and 602, where the symmetric plane for lenses 601 and 602 is the central plane of lens 60S. Therefore, lenses 601 and 602 are longitudinally symmetric with respect to the central plane of lens 60S. In this embodiment, there are three support elements for each lens 601, 60S or 602. To compensate for the aberration caused by the deformation of each lens due to the clamping of its retention device, the positions of the three support elements of symmetric lenses 601 and 602 are the same, with support elements 360/3(=120° apart from one another, and the three support elements of both of lenses 601 and 602 are rotated by 120/2(=60°) with respect to the corresponding three support elements of 60S.

Figure 7:
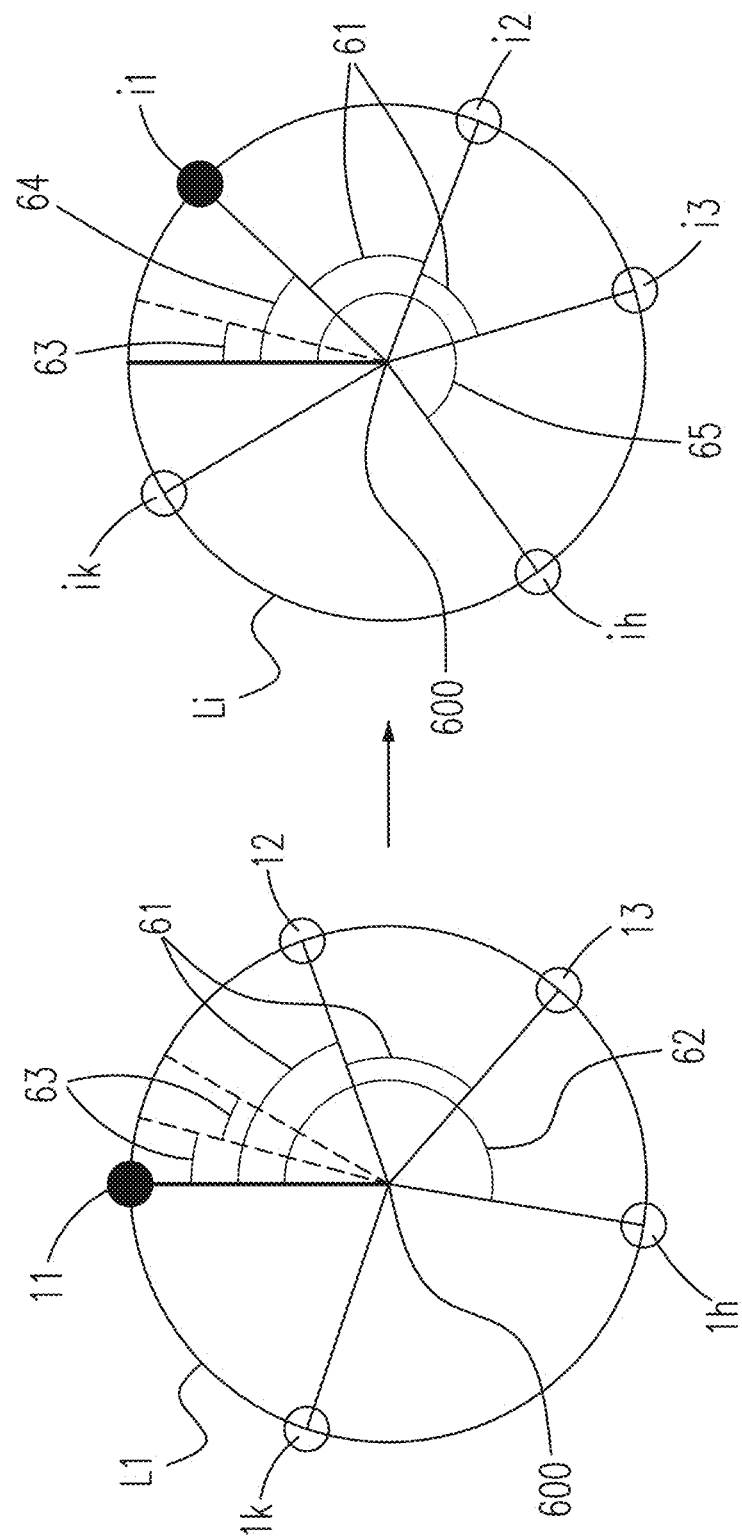
FIG. 7 is a schematic diagram of the configuration angles of the support elements in a lens group in a preferred embodiment of the present invention.

To prevent the aberration caused by the deformation of each lens due to its support elements, the present invention configures appropriately the position of each support element of each lens in each odd-numbered lens group and the corresponding even-numbered lens group, to avoid that the position of a support element of a lens is the same as that of the corresponding support element of the adjacent lens in a lens group. For illustrative purposes, the number of lenses of each odd-numbered and even-numbered lens group is set up to be m (m=1, 2, 3, . . . , i, . . . ), and k (k=1, h, . . . ) support elements are configured for each lens to clamp the lens. As shown in FIG. 7, the first lens L1, its k support elements (11, 12, 13, 1h and 1k) and the rotation angles of support elements for a specific odd-numbered or even-numbered lens group are shown on the left side, and the i-th lens Li, its k support elements (i1, i2, i3, ih to ik) and the rotation angles of support elements for the same specific odd-numbered or even-numbered lens group are shown on the right side.

In a specific embodiment in the present invention such as that shown in FIG. 7, the total angle 360° of a certain lens is uniformly divided into k parts, to obtain a spacing angle 61 being 360°/k between adjacent support elements of the same lens. Each support element of the same lens in the same lens group is configured at the edge of the lens with the spacing angle 61 between adjacent support elements of the same lens. Therefore, the h-th support element for a certain lens in a certain lens group is rotated by a spacing angle 62 being (h−1)×360°/k between non-adjacent support elements of the same lens with respect to the first support element for the same lens. The spacing angle 61 between adjacent support elements of the same lens is then uniformly divided into m parts, to obtain a staggered angle 63 being 360°/(k×m) between support elements of adjacent lens, such that each support element of adjacent lens in the same lens group is rotated by the staggered angle 63 between support elements of adjacent lens of the same lens, around the optical axis 600 connecting the center of curvature of each lens surface, along the clockwise or counterclockwise direction. Therefore, the h-th support element ih for the i-th lens Li in a certain lens group is rotated by a staggered angle 64 being (i−1)×360°/(k×m) between support elements for non-adjacent lens with respect to the h-th support element lh for the first lens L1 in the same lens group. As a result, the h-th support element ih for the i-th lens Li in each lens group is rotated by a total staggered angle 65 of support element being (i−1)×360°/(k×m)+(h−1)×360°/k, with respect to the first support element 11 for the first lens L1 in the same lens group around the optical axis 600 connecting the center of curvature of each lens surface, along the clockwise or counterclockwise direction. The total staggered angle 65 of support element equivalent to the sum of (i−1) multiplied by the staggered angle 63 between support elements of adjacent lens and (h−1) multiplied by the spacing angle 61 between adjacent support elements of the same lens. When applied to the structures of corresponding lens group, the h-th support element ih for the corresponding lens of the i-th lens Li in the lens group (such as the lens group g(2j−1)), i.e. the h-th support element ih for the i-th lens Li in the corresponding lens group (lens group g(2j)), with respect to the first support element lh for the first lens L1 in the same lens group (lens group g(2j)), is also rotated by the same total staggered angle 65 of support element along the same clockwise or counterclockwise direction. Therefore, the set of retention position combinations of each lens group is the same as that of the corresponding lens group, and the sets of same retention position combinations formed for each lens group and its corresponding lens group are also the same.

The systematic angle rotations mentioned above for support elements of each lens in each lens group make the positions of support elements of each lens in each lens group and the corresponding lens group all different from those of the corresponding support elements of all other lenses in the same lens group. When observed from the direction of the central axis of the lens assembly, it can be seen that none of the positions of corresponding support elements of all lenses in the same group overlaps. Therefore, for the light rays passing through each lens, the aberrations due to the deformation at the position of each support element are not superimposed on the final image to cause the aberration to worsen.

The advantage of the configuration of symmetric lens assembly is that, because the curvatures of a lens in each lens group and the corresponding lens in the corresponding lens group are mutually symmetric and opposite to each other, the aberration caused by the self-gravity of each lens and the aberration caused by the self-gravity of the corresponding lens in the corresponding lens group cancel each other out.

Figure 1:
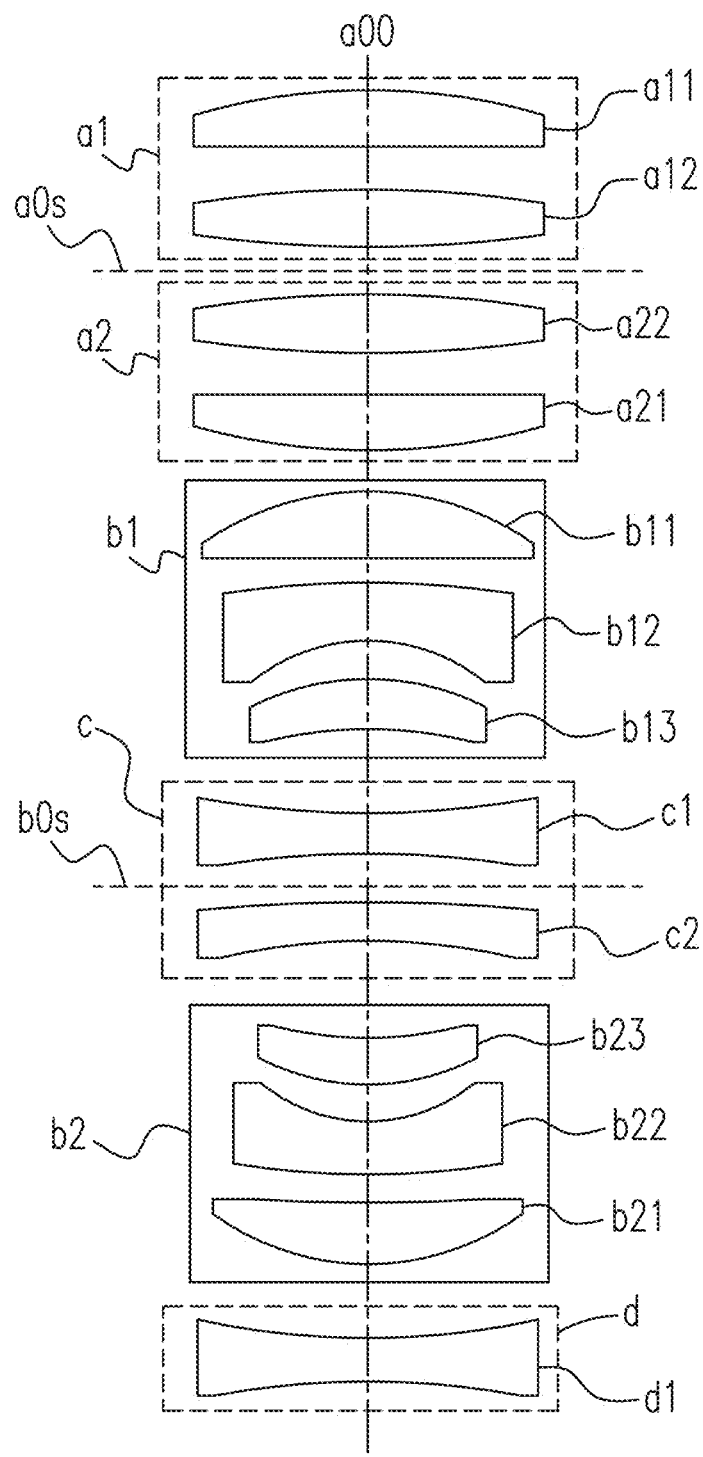
FIG. 1 is an example of configuration drawing for a general lens assembly including symmetric and asymmetric portions.

For asymmetric lens configuration, e.g. lens groups c and d shown in FIG. 1, the lens assembly includes one or more lens groups. Each lens group includes m (m=2, i, . . . ) lenses, where m is greater than or equal to two, and k (k=2, h, . . . ) support elements are configured for each lens to clamp the lens. Because there is no corresponding symmetric lens group for the lens group of asymmetric configuration, the angle rotation method for the support elements of each lens in the odd-numbered lens group of symmetric configuration mentioned above is performed to achieve the effect of compensating for the aberration caused by the deformation of each lens due to the clamping of support elements.

The systematic angle rotations mentioned above make the positions of support elements of each lens in each lens group all different from those of the corresponding support elements of all other lenses in the same lens group. When the positions of all support elements of all lenses in the lens group are observed from the direction of the central axis of the lens assembly, it can be seen that none of the positions of corresponding support elements of all lenses in the same group overlaps. Therefore, the aberrations due to the deformation of each lens at the position of each support element are not superimposed on the final image to cause the aberration to worsen.

The numbers of lenses and support elements included in each lens group shown in the embodiments of the present invention can be increased according to the application need of the lens assembly system, and are not limited by the number of lens groups, the number of lenses and the number of support elements shown in the embodiments of the present invention.

Figure 8:
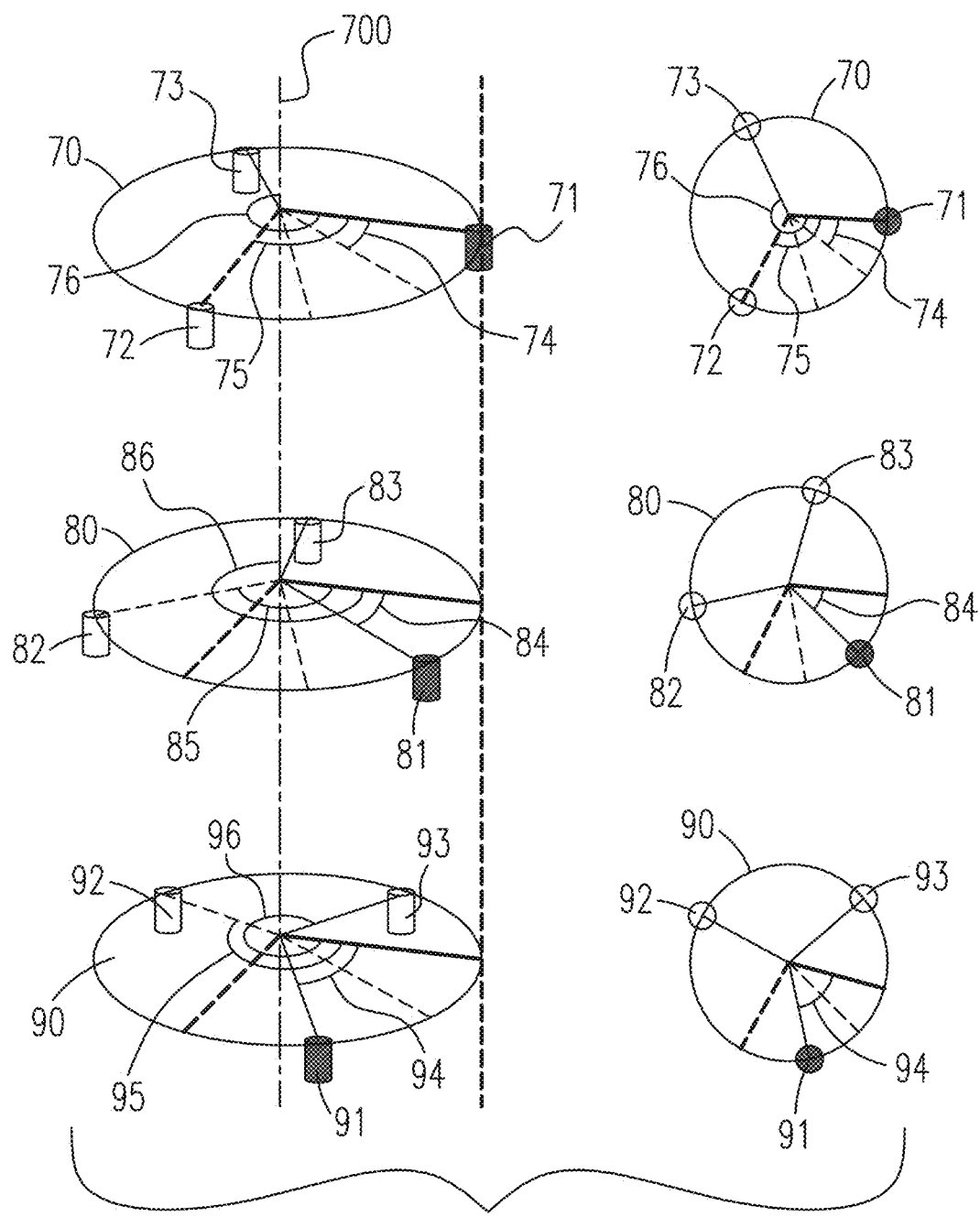
FIG. 8 is a schematic diagram of the configuration angles of the support elements in an asymmetric lens group in a preferred embodiment of the present invention.

In a specific embodiment of the present invention for asymmetric lens configuration, please refer to the schematic diagram of lens group in FIG. 8, where the lens group includes three lenses. Three support elements are configured for each of the three lenses in the lens group. Each support element of different lenses in the lens group is each rotated clockwise or counterclockwise according to its relative rotation angle, around the optical axis 700 connecting the center of curvature of each lens surface. In the rotation angle ((i−1)×360°/(k×m)+(h−1)×360°/k) of the specific embodiment, k is the total number of support elements of each lens (k is 3 in this embodiment), m is the total number of lenses in the lens group (m is 3 in this embodiment), i is the serial number of the lens of each lens (i is 1, 2 or 3 in this embodiment), and h is the serial number of the support element of each lens (h is 1, 2 or 3 in this embodiment). Therefore, the rotation angle in this embodiment is (i−1)×40°+(h−1)×120°.

According to the equation of rotation angle mentioned above, it can be seen that there is a spacing angle of the same lens which is 120° between the first support element and the second support element of each lens, and the spacing angle between the second support element and the third support element is also 120°. The angle 75 between the second support element 72 and the first support element 71 of the first lens 70 is 120°, and the angle 76 between the third support element 73 and the first support element 71 of the first lens 70 is 120°×2=240°.

It can be seen that, in the same manner as described above, the angle 84 between the first support element 81 of the second lens 80 and the first support element 71 of the first lens 70 is 40°. Because the angle between the first support element and the second support element is 120°, the angle 85 between the second support element 82 of the second lens 80 and the first support element 71 of the first lens 70 is 160° (=120°+40°), and the angle 86 between the third support element 83 of the second lens 80 and the first support element 71 of the first lens 70 is 280° (=120°×2+40°).

In the same manner as described above, it can be seen that the angle 94 between the first support element 91 of the third lens 90 and the first support element 71 of the first lens 70 is 80°, the angle 95 between the second support element 92 of the third lens 90 and the first support element 71 of the first lens 70 is 200° (=120°+80°), and the angle 96 between the third support element 93 of the third lens 90 and the first support element 71 of the first lens 70 is 320° (=120°×2+80°). On the other hand, as shown in FIG. 8, when observed from the central optical axis 700, it can be seen that none of the positions of all the support elements of the first lens 70, the second lens 80 and the third lens 90 in the lens group of the embodiment overlaps. Therefore, for the light rays passing through each lens, the aberrations due to the deformation at the position of each support element are not superimposed on the final image to cause the aberration to worsen.

Figure 9:
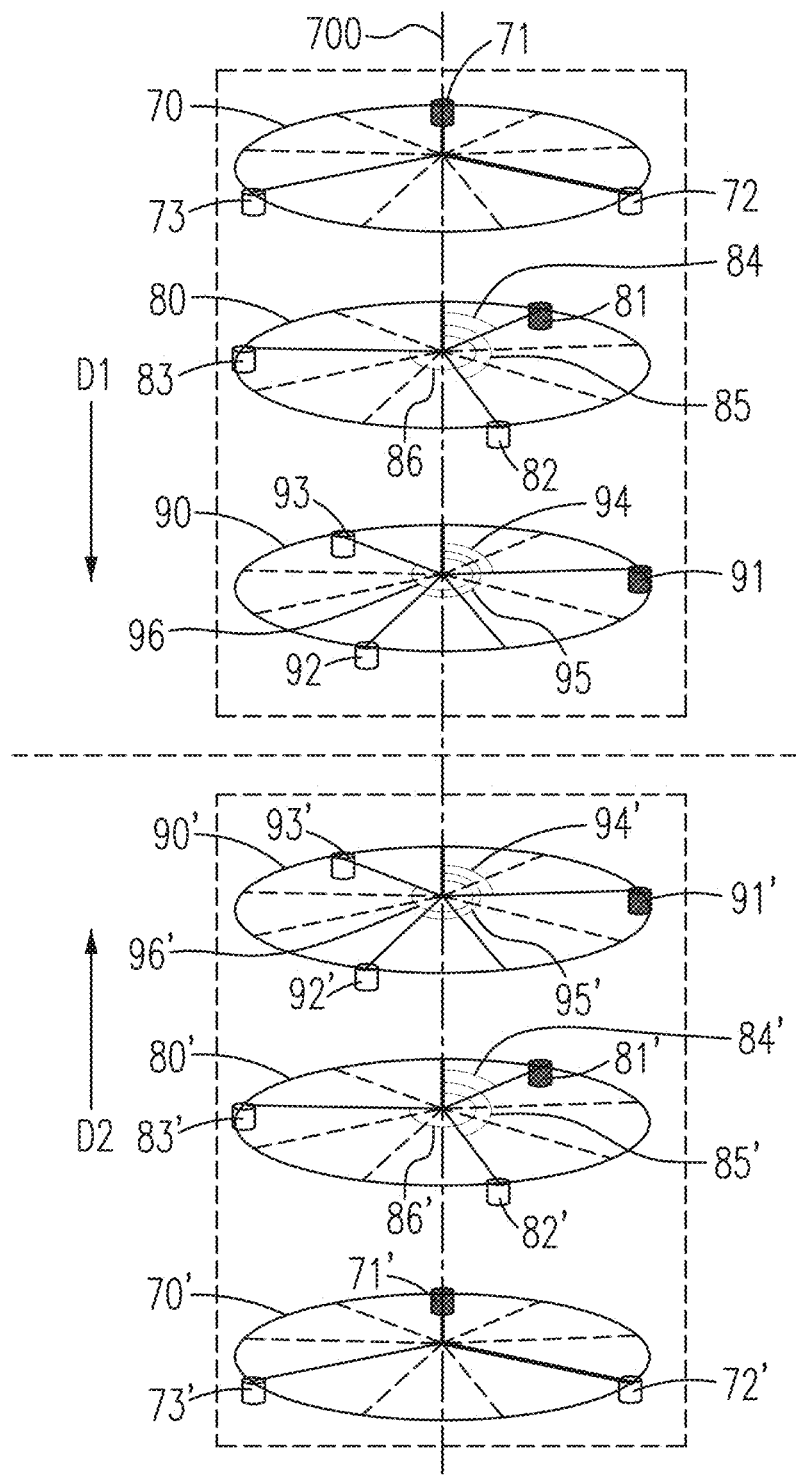
FIG. 9 is a schematic diagram of the configuration angles of the support elements in a symmetric lens group in a preferred embodiment of the present invention.

Please refer to FIG. 9, which shows another embodiment in the present invention. In the embodiment, an asymmetric lens group is extended to the structure of a symmetric lens group. Shown in the embodiment are two mutually symmetric lens groups, in which each lens group includes three lenses. The symmetric lens groups are divided into odd-numbered lens groups g(2j−1) and the corresponding even-numbered lens groups g(2j). The embodiment offers a simplified description for two symmetric lens groups g(2j−1) and g(2j), where j=1. The odd-numbered lens group g(2j−1) includes the first lens, the second lens and the third lens arranged along the first direction D1 (from top to bottom in this embodiment). The even-numbered lens group g(2j) includes the first lens, the second lens and the third lens arranged along the second direction D2 (from bottom to top in this embodiment), opposite to the first direction D1. The first lens, the second lens and the third lens in the odd-numbered lens group g(2j−1) respectively correspond to the first lens, the second lens and the third lens in the even-numbered lens group g(2j), and they are symmetric or quasi-symmetric with respect to a symmetric plane.

It is worth noting that, in this embodiment the lens surfaces of the lenses in the odd-numbered lens group g(2j−1) and the lens surfaces of the corresponding lenses in the even-numbered lens group g(2j) are opposite with respect to the symmetric plane, and thus for the light ray passing through the optical axis, the curvatures of corresponding lenses are mutually reversed.

It can be seen that from the structure of asymmetric lens group shown in the embodiment, the angle between a support element and the adjacent support element is 120° for each lens in the odd-numbered lens group g(2j−1) and the corresponding even-numbered lens group g(2j). At the same time, in the odd-numbered lens group g(2j−1) and the corresponding even-numbered lens group g(2j), the angles 84 and 84' between the first support elements 81 and 81' of the second lenses 80 and 80' in the two lens groups and the first support elements 71 and 71' of the first lenses 70 and 70' in the respective lens groups are both 40°, the angles 85 and 85' between the second support elements 82 and 82' of the second lenses 80 and 80' and the first support elements 71 and 71' of the first lenses 70 and 70' in the respective lens groups are both 160°, and the angles 86 and 86' between the third support elements 83 and 83' of the second lenses 80 and 80' and the first support elements 71 and 71' of the first lenses 70 and 70' in the respective lens groups are both 280°. Moreover, the angles 94 and 94' between the first support elements 91 and 91' of the third lenses 90 and 90' and the first support elements 71 and 71' of the first lenses 70 and 70' in the respective lens groups are both 80°, the angles 95 and 95' between the second support elements 92 and 92' of the third lenses 90 and 90' and the first support elements 71 and 71' of the first lenses 70 and 70' in the respective lens groups are both 200°, and the angles 96 and 96' between the third support elements 93 and 93' of the third lenses 90 and 90' and the first support elements 71 and 71' of the first lenses 70 and 70' in the respective lens groups are both 320°.

On the other hand, it can be seen that when observed from the direction of the optical axis 700 connecting the center of curvature of each lens surface of the lens assembly, none of the positions of all the support elements of the first lens, the second lens and the third lens in the respective group overlaps in the odd-numbered lens group g(2j−1) and the corresponding even-numbered lens group g(2j), since the positions are staggered. Therefore, for the light rays passing through the positions of the support elements of each lens, the aberrations caused by the deformation due to each support element do not accumulate to form a bigger aberration due to deformations on the surface of final projection target (such as a wafer, not shown). In addition, the positions of the support elements of the first lens 70, the second lens 80 and the third lens 90 in the odd-numbered lens group g(2j−1): 71, 72, 73, 81, 82, 83, 91, 92 and 93 are respectively the same as the positions of the support elements of the corresponding first lens 70', second lens 80' and third lens 90' in the corresponding even-numbered lens group g(2j): 71', 72', 73', 81', 82', 83', 91', 92' and 93'. Because for the light ray passing through the optical axis of the lens assembly the curvatures of each pair of symmetric lenses in the symmetric lens groups are mutually reversed, the aberrations cancel each other out to a minimum.

Figure 10:
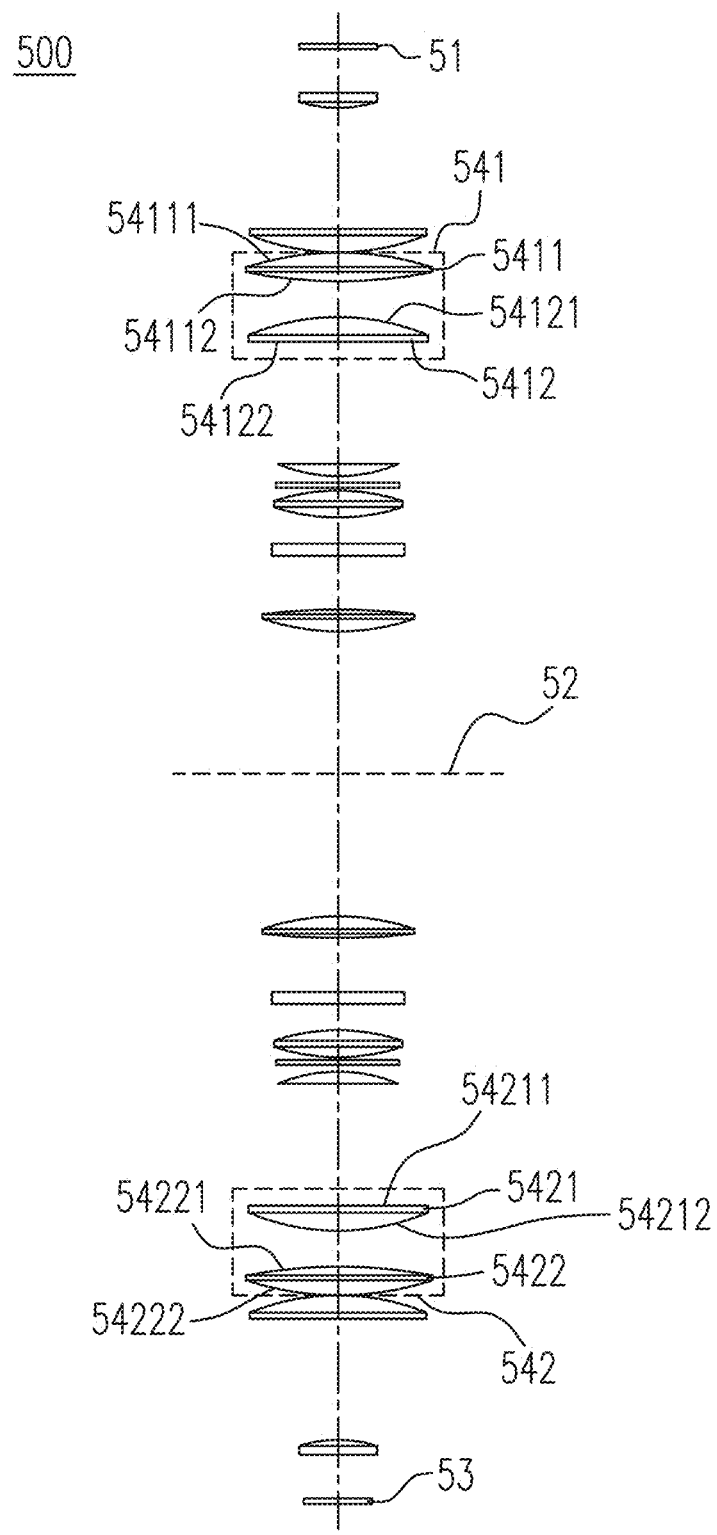
FIG. 10 is a schematic diagram of a symmetric lens group set in a preferred embodiment of the present invention.

For another embodiment of the present invention, please refer to FIG. 10. This embodiment is an i-line (wavelength λ=360 nm) lens assembly 500 in a vertical lithographic lens, which projects and exposes the pattern on photomask 51 onto wafer 53. The lens assembly 500 has a symmetric structure with the position of aperture being the symmetric plane 52. The lens assembly 500 includes an odd-numbered lens group 541 and an opposite even-numbered lens group 542 with respect to the symmetric plane 52. The odd-numbered lens group 541 includes lens 5411 and lens 5412. The even-numbered lens group 542 includes lens 5421 and lens 5422 corresponding to lens 5412 and lens 5411, respectively. The diameters of lenses 5411 and 5422 are 290 mm, and the diameters of lenses 5412 and 5421 are 280 mm. Lenses 5411, 5412, 5421 and 5422 are retained in respective sub lens barrels (not shown) with three-point support elements. The three-point support elements of lens 5412 and lens 5421 are all rotated clockwise by 60° relative to those of lens 5411 and lens 5422, around an axis connecting the center of curvature of each lens surface, to compensate for the aberration caused by deformation due to the clamping of support elements.

Lens 5411 includes lens surface 54111 facing away from the symmetric plane 52 and lens surface 54112 facing toward the symmetric plane 52, and lens 5412 includes lens surface 54121 facing away from the symmetric plane 52 and lens surface 54122 facing toward the symmetric plane 52. On the other hand, in the even-numbered lens group 542, lens 5421 includes lens surface 54212 facing away from the symmetric plane 52 and lens surface 54211 facing toward the symmetric plane 52, and lens 5422 includes lens surface 54222 facing away from the symmetric plane 52 and lens surface 54221 facing toward the symmetric plane 52. Relative to the symmetric plane 52, lens surface 54111 and lens surface 54222 are symmetric, lens surface 54112 and lens surface 54221 are symmetric, lens surface 54121 and lens surface 54212 are symmetric, and lens surface 54122 and lens surface 54211 are symmetric. Lenses 5411, 5412, 5421 and 5422 in the embodiment are retained in respective sub lens barrels with three-point support elements.

Figure 11A:
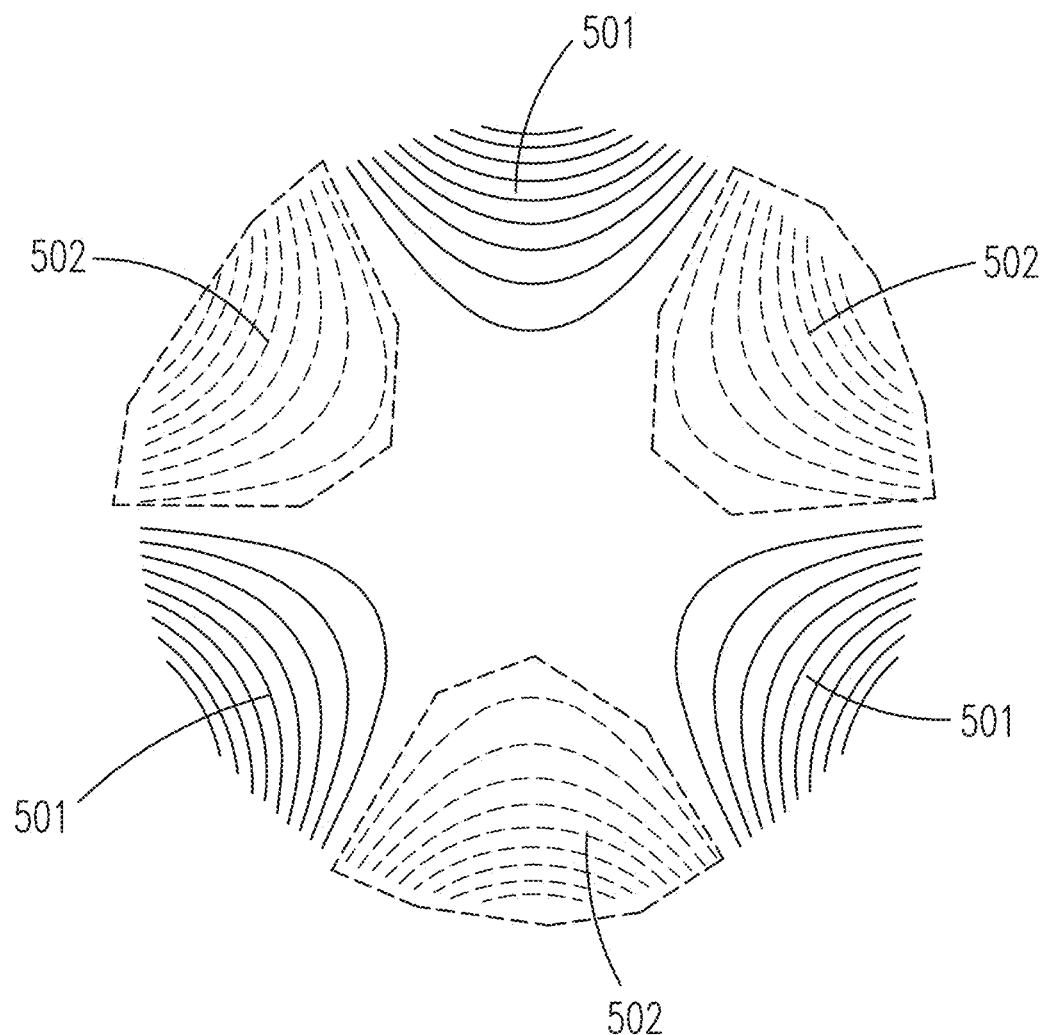
FIG. 11A is the surface error contour of a lens surface.
Figure 11B:
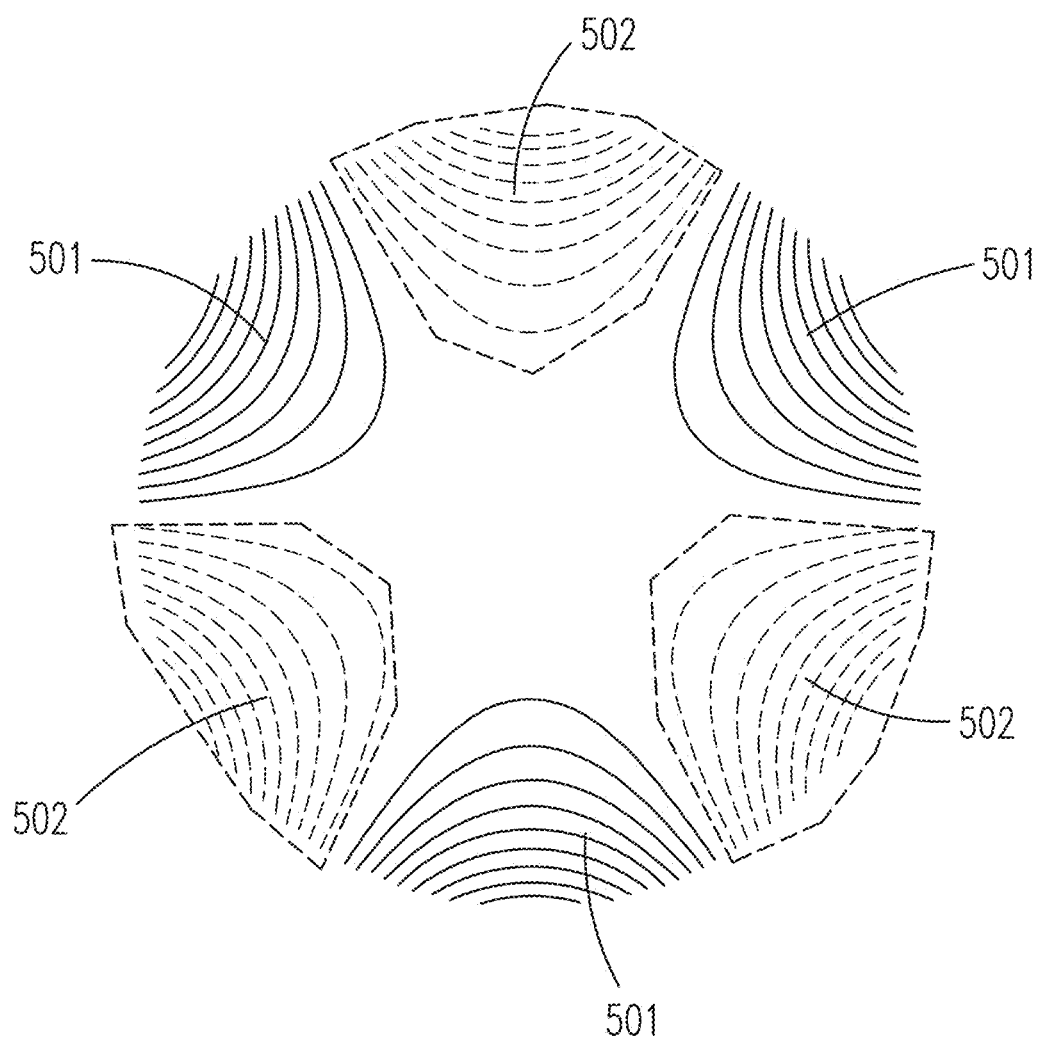
FIG. 11B is the surface error contour of another lens surface.

Please refer to FIGS. 11A and 11B, which respectively show the surface error contours of lens surface 54111 and lens surface 54112 due to the deformation amounts caused by the three-point support elements of the retention devices. In the protruding deformation area 501, corresponding to the positions of support elements of the lens, the curves shown by the solid lines are used, and in the sinking deformation area 502, corresponding to the areas between the positions of support elements of the lens, the curves shown by the dashed lines are used. The areas with denser curves represent the lens surface areas with bigger deformation amounts, and the broader the areas with dense curves, the larger the lens surface areas affected by aberrations. It can be seen from FIGS. 11A and 11B that, the areas with dense curves showing protruding deformation distribute uniformly around the three-point support elements, and the areas between the positions of the three-point support elements show relatively sinking deformation. Both the protruding and sinking deformations cause wavefront error.

Figure 12A:
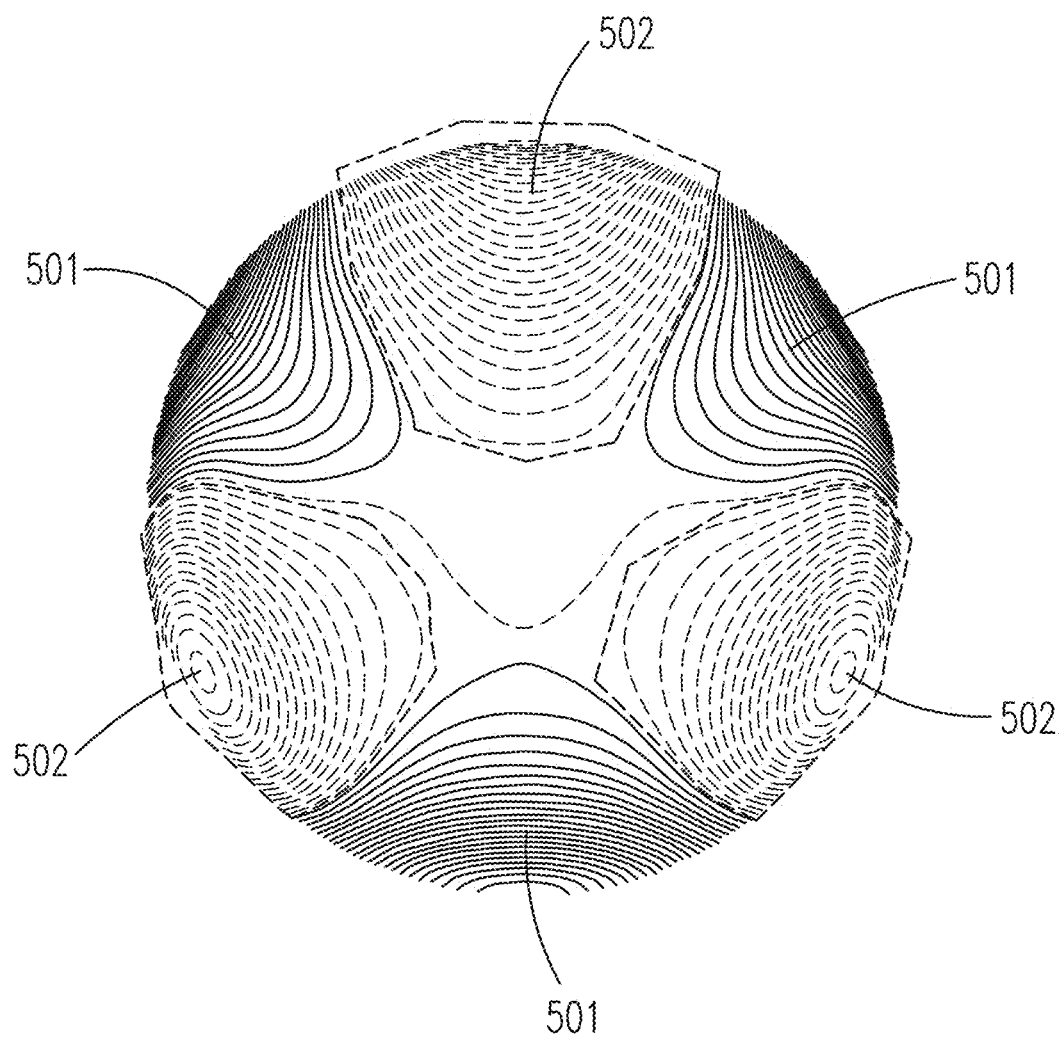
FIG. 12A is the system wavefront error contour of a symmetric lens group set in the prior art.
Figure 12B:
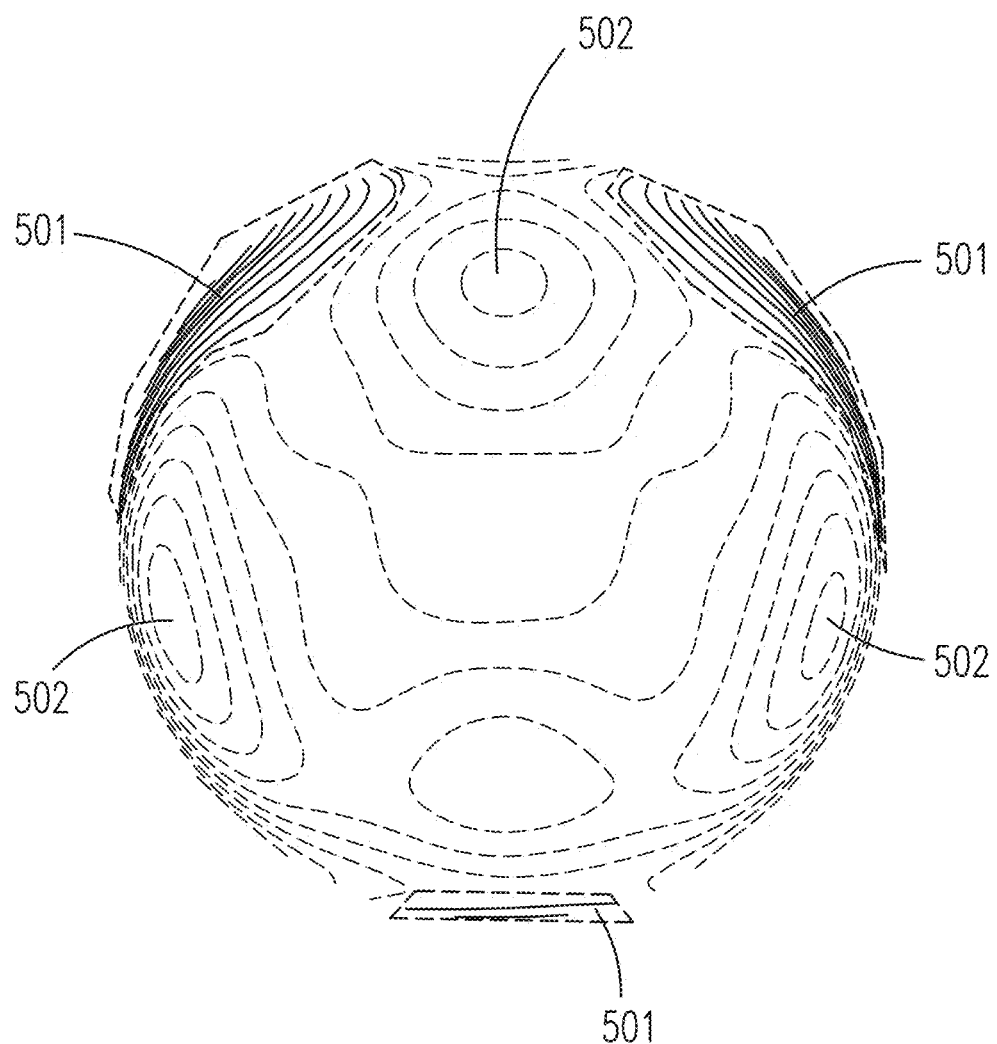
FIG. 12B is the system wavefront error contour of the symmetric lens group set in a preferred embodiment of the present invention.

Please refer to FIG. 12A, which shows the total wavefront error contour accumulated from all the lenses in the lens assembly 500 in the vertical lithographic lens without applying the compensation method of the present invention. It can be seen that if the positions of the three-point support elements of each lens are the same, the optical quality will degenerate because of the surface deformation due to the retaining of support elements, with the simulated wavefront error increasing to 0.26λ and the areas with dense curves distributing uniformly around the positions of the three-point support elements. After applying the compensation method of the present invention, the wavefront error is reduced to 0.0743λ. As shown in FIG. 12B, the density of curves is lower than that shown in FIG. 12A, and the areas with dense curves are relatively shrunk, thus the effect of lens surface deformation caused by the positions of the support elements to optical quality is effectively decreased.

EMBODIMENTS

1. An adjustment method for lenses in a lens assembly, wherein the lens assembly includes a plurality of lenses having a total number of lenses being at least 3, the adjustment method comprising:

arranging the plurality of lenses along an optical axis, wherein a light moves forward along a first direction of the optical axis;

dividing at least a portion of the plurality of lenses into 2n groups, wherein n is a positive integer, the 2n groups are divided into a 1st group to a 2n-th group including n odd-numbered groups and n even-numbered groups, a j-th group of the 2n groups has m(j) lenses, j is a positive integer being no larger than 2n, m(j) is a positive integer being at least 2, the lenses in each of the 2n groups include a 1(j)st lens, . . . , an (i−1)(j)-th lens, an i(j)-th lens, . . . , and an m(j)-th lens, i is a positive integer being no larger than m(j), the odd-numbered groups from the 1st group to the (2n−1)-th group correspond sequentially to the even-numbered groups from the 2nd group to the 2n-th group, and the lenses in the odd-numbered groups correspond sequentially to the lenses in the corresponding even-numbered groups;

configuring a plurality of retention devices for the plurality of lenses, wherein each of the plurality of retention devices has a corresponding lens in the plurality of lenses, each of the plurality of retention devices retains the corresponding lens through k support elements, k is a positive integer being no less than 2, the k support elements are evenly distributed around an edge of the corresponding lens, each of the k support elements has a retention position, and the retention positions of the k support elements for both the i(2n−1)-th lens of the (2n−1)-th group and the i(2n)-th lens of the 2n-th group are the same; and rotating each of the retention positions of the k support elements for the i(2n−1)-th lens, wherein an h-th support element of the k support elements for the i(2n−1)-th lens is rotated by a rotation angle α with respect to the retention position of a first support element of the k support elements for the (i−1)(2n−1)-th lens, $$\alpha = \frac{360°}{k \times m_{(2n-1)}} + (h-1) \times \frac{360°}{k},$$

where h is an integer from 1 to k, so that when observed from the optical axis, the retention positions of the k support elements for the (i−1)(2n−1)-th lens are different from the retention positions of the k support elements for the i(2n−1)-th lens, and the retention positions of the k support elements for the (i−1)(2n)-th lens are different from the retention positions of the k support elements for the i(2n)-th lens.

2. The adjustment method according to Embodiment 1, wherein each of the plurality of lenses has a diameter being no less than 100 mm.

3. The adjustment method according to Embodiment 1 or 2, wherein there is a second direction opposite to the first direction, a sequence of j for the odd-numbered groups is along the first direction, while a sequence of j for the even-numbered groups is along the second direction and a lens in the plurality of lenses other than the 2n groups is arranged in a position being one selected from a group consisting of being located between one of the odd-numbered groups and an adjacent odd-numbered group, between one of the even-numbered groups and an adjacent even-numbered group, between the odd-numbered groups and the even-numbered groups, at a starting point of the optical axis along the first direction, and at a starting point of the optical axis along the second direction.

4. The adjustment method according to any one of Embodiments 1-3, wherein the optical axis is perpendicular to a horizontal plane.

5. A lens assembly device, comprising:
  a plurality of lenses having a total number of lenses being at least 3, wherein
  the plurality of lenses are arranged along an optical axis, a light moves forward along a first direction of the optical axis, and
  at least a portion of the plurality of lenses are divided into 2n groups including n odd-numbered groups and n even-numbered groups, n is a positive integer, a j-th group of the 2n groups has m(j) lenses, j is a positive integer being no larger than 2n, m(j) is at least 2, the lenses in each of the 2n groups include a l(j)st lens, . . . , an (i−1)(j)-th lens, an i(j)-th lens, . . . , and an m(j)-th lens, i is a positive integer being no larger than m(j), the odd-numbered groups from the 1st group to the (2n−1)-th group correspond sequentially to the even-numbered groups from the 2nd group to the 2n-th group, and the lenses in the odd-numbered groups correspond sequentially to the lenses in the corresponding even-numbered groups;
  a plurality of retention devices, wherein each of the plurality of retention devices retains an edge of a lens of the odd-numbered groups and the even-numbered groups through a plurality of support elements, the i(2n−1)-th lens has k support elements, each of the plurality of support elements has a retention position, and the retention positions of the plurality of support elements for both the i(2n−1)-th lens of the (2n−1)-th group and the i(2n)-th lens of the 2n-th group are the same; and
  a rotating unit coupled to the plurality of retention devices and configured to rotate the retention position of an h-th support element of the k support elements for the i(2n−1)-th lens by a rotation angle α(h) with respect to the retention position of a first support element of the k support elements for the (i−1)(2n−1)-th lens, wherein $$\alpha(h) = \frac{360°}{k \times m_{(2n-1)}} + (h-1) \times \frac{360°}{k},$$

where h is an integer from 1 to k, so that when observed from the optical axis, the retention position of the h-th support element of the k support elements for the i(2n−1)-th lens is the same as the retention position of the h-th support element of the k support elements for the i(2n)-th lens, and the retention position of the h-th support element for the (i−1)(2n)-th lens is different from both the retention positions of the h-th and the (h−1)-th support elements for the i(2n)-th lens.

6. The lens assembly device according to Embodiment 5, wherein each of the plurality of lenses has a diameter being no less than 100 mm.

7. The lens assembly device according to Embodiment 5 or 6, wherein a pair of corresponding lenses in the plurality of lenses are symmetric lenses.

8. The lens assembly device according to any one of Embodiments 5-7, wherein each of the plurality of lenses has a material property of a Young's modulus to specific gravity ratio, and a pair of corresponding lenses in the plurality of lenses have a difference of the material properties being within ±20%.

9. The lens assembly device according to any one of Embodiments 5-8, wherein a pair of corresponding lenses in the plurality of lenses have a difference of diameters being within ±20%.

10. The lens assembly device according to any one of Embodiments 5-9, wherein a pair of corresponding lenses in the plurality of lenses are both double-convex lenses, and the pair of corresponding lenses have a difference of diameters being within ±10%.

11. The lens assembly device according to any one of Embodiments 5-10, wherein a pair of corresponding lenses in the plurality of lenses have a difference of radii of curvature being within ±30%.

12. The lens assembly device according to any one of Embodiments 5-11, wherein a pair of corresponding lenses in the plurality of lenses are both double-convex lenses, and the pair of corresponding lenses have a difference of radii of curvature being within ±10%.

13. The lens assembly device according to any one of Embodiments 5-12, wherein each of the plurality of lenses has an aspect ratio being a diameter to center thickness ratio, and a pair of corresponding lenses in the plurality of lenses have a difference of the aspect ratios being within ±20%.

14. The lens assembly device according to any one of Embodiments 5-13, wherein each of the plurality of lenses has an aspect ratio being a diameter to center thickness ratio, a pair of corresponding lenses in the plurality of lenses are both double-convex lenses, and the pair of corresponding lenses have a difference of the aspect ratios being within ±10%.

15. The lens assembly device according to any one of Embodiments 5-14, wherein each of the plurality of retention devices has a ring structure and is configured in a sub lens barrel for a lens to load the lens, and the plurality of support elements are configured on the ring structure.

16. A lens assembly device, comprising:
  a plurality of lenses arranged sequentially along an optical axis; and
  a plurality of retention devices for respectively retaining the plurality of lenses, wherein:
  each of the plurality of retention devices includes a plurality of support elements for retaining an edge of the respective lens under a relatively lowest stress;
  the plurality of support elements for a first lens in the plurality of lenses have a first retention position combination;
  the plurality of support elements for a second lens in the plurality of lenses have a second retention position combination; and
  there is a rotation angle α between the first retention position combination and the second retention position combination.

17. The lens assembly device according to Embodiment 16, wherein both the first lens and the second lens belong to a first group in the plurality of lenses, and the rotation angle α is calculated from $$\alpha = \frac{360°}{k \times m} + l \times \frac{360°}{k},$$

wherein there are m lenses in the first group, there are k support elements for each of the first and the second lenses, and l is an integer.

18. The lens assembly device according to Embodiment 17, wherein k=3.

19. The lens assembly device according to Embodiment 17 or 18, wherein there is a second group in the plurality of lenses, the second group includes a third lens and a fourth lens, the first through the fourth lenses are arranged sequentially along the optical axis, the plurality of support elements for the third lens have a third retention position combination, the plurality of support elements for the fourth lens have a fourth retention position combination, the first and the fourth retention position combinations are the same, and the second and the third retention position combinations are the same.

20. The lens assembly device according to any one of Embodiments 16-19, wherein an aberration due to a gravity is compensated.

It is contemplated that modifications and combinations will readily occur to those skilled in the art, and these modifications and combinations are within the scope of this invention.

What is claimed is:

1. An adjustment method for lenses in a lens assembly, wherein the lens assembly includes a plurality of lenses having a total number of lenses being at least 3, the adjustment method comprising:
    arranging the plurality of lenses along an optical axis, wherein a light moves forward along a first direction of the optical axis;
    dividing at least a portion of the plurality of lenses into 2n groups, wherein n is a positive integer, the 2n groups are divided into a 1st group to a 2n-th group including n odd-numbered groups and n even-numbered groups, a j-th group of the 2n groups has $m_{(j)}$ lenses, j is a positive integer being no larger than 2n, $m_{(j)}$ is a positive integer being at least 2, the lenses in each of the 2n groups include a $1_{(j)}$st lens, . . . , an $(i-1)_{(j)}$-th lens, an $i_{(j)}$-th lens, . . . , and an $m_{(j)}$-th lens, i is a positive integer being no larger than $m_{(j)}$, the odd-numbered groups from the $1^{st}$ group to the (2n-1)-th group correspond sequentially to the even-numbered groups from the $2^{nd}$ group to the 2n-th group, and the lenses in the odd-numbered groups correspond sequentially to the lenses in the corresponding even-numbered groups;
    configuring a plurality of retention devices for the plurality of lenses, wherein each of the plurality of retention devices has a corresponding lens in the plurality of lenses, each of the plurality of retention devices retains the corresponding lens through k support elements, k is a positive integer being no less than 2, the k support elements are evenly distributed around an edge of the corresponding lens, each of the k support elements has a retention position, and the retention positions of the k support elements for both the $i_{(2n-1)}$-th lens of the (2n-1)-th group and the $i_{(2n)}$-th lens of the 2n-th group are the same; and
    rotating each of the retention positions of the k support elements for the $i_{(2n-1)}$-th lens, wherein an h-th support element of the k support elements for the $i_{(2n-1)}$-th lens is rotated by a rotation angle α with respect to the retention position of a first support element of the k support elements for the $(i-1)_{(2n-1)}$-th lens, $$\alpha = \frac{360°}{k \times m_{(2n-1)}} + (h-1) \times \frac{360°}{k},$$

where h is an integer from 1 to k, so that when observed from the optical axis, the retention positions of the k support elements for the $(i-1)_{(2n-1)}$-th lens are different from the retention positions of the k support elements for the $i_{(2n-1)}$-th lens, and the retention positions of the k support elements for the $(i-1)_{(2n)}$-th lens are different from the retention positions of the k support elements for the $i_{(2n)}$-th lens.

2. The adjustment method as claimed in claim 1, wherein each of the plurality of lenses has a diameter being no less than 100 mm.

3. The adjustment method as claimed in claim 1, wherein there is a second direction opposite to the first direction, a sequence of j for the odd-numbered groups is along the first direction, while a sequence of j for the even-numbered groups is along the second direction and a lens in the plurality of lenses other than the 2n groups is arranged in a position being one selected from a group consisting of being located between one of the odd-numbered groups and an adjacent odd-numbered group, between one of the even-numbered groups and an adjacent even-numbered group, between the odd-numbered groups and the even-numbered groups, at a starting point of the optical axis along the first direction, and at a starting point of the optical axis along the second direction.

4. The adjustment method as claimed in claim 1, wherein the optical axis is perpendicular to a horizontal plane.

5. A lens assembly device, comprising:
    a plurality of lenses having a total number of lenses being at least 3, wherein the plurality of lenses are arranged along an optical axis, a light moves forward along a first direction of the optical axis, and
    at least a portion of the plurality of lenses are divided into 2n groups including n odd-numbered groups and n even-numbered groups, n is a positive integer, a j-th group of the 2n groups has $m_{(j)}$ lenses, j is a positive integer being no larger than 2n, $m_{(j)}$, is at least 2, the lenses in each of the 2n groups include a $1_{(j)}$st lens, . . . , an $(i-1)_{(j)}$-th lens, an $i_{(j)}$-th lens, . . . , and an $m_{(j)}$-th lens, i is a positive integer being no larger than $m_{(j)}$, the odd-numbered groups from the $1^{st}$ group to the (2n-1)-th group correspond sequentially to the even-numbered groups from the $2^{nd}$ group to the 2n-th group, and the lenses in the odd-numbered groups correspond sequentially to the lenses in the corresponding even-numbered groups;
    a plurality of retention devices, wherein each of the plurality of retention devices retains an edge of a lens of the odd-numbered groups and the even-numbered groups through a plurality of support elements, the $i_{(2n-1)}$-th lens has k support elements, each of the plurality of support elements has a retention position, and the retention positions of the plurality of support elements for both the $i_{(2n-1)}$-th lens of the (2n-1)-th group and the $i_{(2n)}$-th lens of the 2n-th group are the same; and
    a rotating unit coupled to the plurality of retention devices and configured to rotate the retention position of an h-th support element of the k support elements for the $i_{(2n-1)}$-th lens by a rotation angle α(h) with respect to the retention position of a first support element of the k support elements for the $(i-1)_{(2n-1)}$-th lens, wherein $$\alpha(h) = \frac{360°}{k \times m_{(2n-1)}} + (h-1) \times \frac{360°}{k},$$

where h is an integer from 1 to k, so that when observed from the optical axis, the retention position of the h-th support element of the k support elements for the i(2n-1)-th lens is the same as the retention position of the h-th support element of the k support elements for the i(2n)-th lens, and the retention position of the h-th support element for the (i-1)(2n)-th lens is different from both the retention positions of the h–th and the (h–1)-th support elements for the i(2n)-th lens.

6. The lens assembly device as claimed in claim 5, wherein each of the plurality of lenses has a diameter being no less than 100 mm.

7. The lens assembly device as claimed in claim 5, wherein a pair of corresponding lenses in the plurality of lenses are symmetric lenses.

8. The lens assembly device as claimed in claim 5, wherein each of the plurality of lenses has a material property of a Young's modulus to specific gravity ratio, and a pair of corresponding lenses in the plurality of lenses have a difference of the material properties being within ±20%.

9. The lens assembly device as claimed in claim 5, wherein a pair of corresponding lenses in the plurality of lenses have a difference of diameters being within ±20%.

10. The lens assembly device as claimed in claim 5, wherein a pair of corresponding lenses in the plurality of lenses are both double-convex lenses, and the pair of corresponding lenses have a difference of diameters being within ±10%.

11. The lens assembly device as claimed in claim 5, wherein a pair of corresponding lenses in the plurality of lenses have a difference of radii of curvature being within ±30%.

12. The lens assembly device as claimed in claim 5, wherein a pair of corresponding lenses in the plurality of lenses are both double-convex lenses, and the pair of corresponding lenses have a difference of radii of curvature being within ±10%.

13. The lens assembly device as claimed in claim 5, wherein each of the plurality of lenses has an aspect ratio being a diameter to center thickness ratio, and a pair of corresponding lenses in the plurality of lenses have a difference of the aspect ratios being within ±20%.

14. The lens assembly device as claimed in claim 5, wherein each of the plurality of lenses has an aspect ratio being a diameter to center thickness ratio, a pair of corresponding lenses in the plurality of lenses are both double-convex lenses, and the pair of corresponding lenses have a difference of the aspect ratios being within ±10%.

15. The lens assembly device as claimed in claim 5, wherein each of the plurality of retention devices has a ring structure and is configured in a sub lens barrel for a lens to load the lens, and the plurality of support elements are configured on the ring structure.

16. A lens assembly device, comprising:
a plurality of lenses arranged sequentially along an optical axis; and
a plurality of retention devices for respectively retaining the plurality of lenses, wherein:
each of the plurality of retention devices includes a plurality of support elements for retaining an edge of the respective lens under a relatively lowest stress;
the plurality of support elements for a first lens in the plurality of lenses have a first retention position combination;
the plurality of support elements for a second lens in the plurality of lenses have a second retention position combination;
there is a rotation angle α between the first retention position combination and the second retention position combination; and
both the first lens and the second lens belong to a first group in the plurality of lenses, and the rotation angle α is calculated from $$\alpha = \frac{360°}{k \times m} + l \times \frac{360°}{k},$$

wherein there are m lenses in the first group, there are k support elements for each of the first and the second lenses, and l is an integer.

17. The lens assembly device as claimed in claim 16, wherein k=3.

18. The lens assembly device as claimed in claim 16, wherein there is a second group in the plurality of lenses, the second group includes a third lens and a fourth lens, the first through the fourth lenses are arranged sequentially along the optical axis, the plurality of support elements for the third lens have a third retention position combination, the plurality of support elements for the fourth lens have a fourth retention position combination, the first and the fourth retention position combinations are the same, and the second and the third retention position combinations are the same.

19. The lens assembly device as claimed in claim 18, wherein an aberration due to a gravity is compensated.

* * * * *